(12) United States Patent
George et al.

(10) Patent No.: US 11,347,828 B2
(45) Date of Patent: May 31, 2022

(54) METHODS, APPARATUS, ARTICLES OF MANUFACTURE TO PERFORM ACCELERATED MATRIX MULTIPLICATION

(71) Applicant: Intel Corporation, Santa Clara, CA (US)

(72) Inventors: Biji George, Bangalore (IN); Om Ji Omer, Bangalore (IN); Dipan Kumar Mandal, Bangalore (IN); Cormac Brick, San Francisco, CA (US); Lance Hacking, Spanish Fork, UT (US); Sreenivas Subramoney, Bangalore (IN); Belliappa Kuttanna, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/833,210

(22) Filed: Mar. 27, 2020

(65) Prior Publication Data

US 2020/0226203 A1    Jul. 16, 2020

Related U.S. Application Data

(60) Provisional application No. 62/994,211, filed on Mar. 24, 2020.

(51) Int. Cl.
  *G06F 17/16*    (2006.01)
(52) U.S. Cl.
  CPC ................... *G06F 17/16* (2013.01)
(58) Field of Classification Search
  CPC .......................................... G06F 17/16

USPC ......................................................... 708/607
See application file for complete search history.

(56) References Cited

U.S. PATENT DOCUMENTS 10,140,251 B2 *  11/2018  Zhou .................. G06F 9/30036
2018/0107630 A1   4/2018   Zhou et al.
2020/0226203 A1   7/2020   George et al.

OTHER PUBLICATIONS

European Patent Office, "Extended European Search Report," mailed in connection with European Patent Application No. 20213035.7, dated Jun. 2, 2021, 8 pages.
Kumar et al., "FPGA Based High Performance Double-Precision Matrix Multiplication," Int. J. Parallel Prog., vol. 38, No. 3-4, Feb. 2010, 17 pages.
Mandal et al., "Visual Inertial Odometry At the Edge: A Hardware-Software Co-Design Approach for Ultra-Low Latency and Power", May 16, 2019, pp. 960-963, (4 pages).

(Continued)

*Primary Examiner* — Tan V Mai
(74) *Attorney, Agent, or Firm* — Hanley, Flight & Zimmerman, LLC

(57) ABSTRACT

A disclosed apparatus to multiply matrices includes a compute engine. The compute engine includes multipliers in a two dimensional array that has a plurality of array locations defined by columns and rows. The apparatus also includes a plurality of adders in columns. A broadcast interconnect between a cache and the multipliers broadcasts a first set of operand data elements to multipliers in the rows of the array. A unicast interconnect unicasts a second set of operands between a data buffer and the multipliers. The multipliers multiply the operands to generate a plurality of outputs, and the adders add the outputs generated by the multipliers.

24 Claims, 19 Drawing Sheets

(56) References Cited

OTHER PUBLICATIONS

E. S. Jones et al., "Visual-inertial navigation, mapping and localization: A scalable real-time causal approach," Int. J. Robotics Research., Aug. 27, 2009, (38 pages).
R. E. Kalman, "A new approach to linear filtering and prediction problems," Journal of basic Engineering, vol. 82, 1960, (12 pages).
J. Delmerico and D. Scaramuzza, "A benchmark comparison of monocular visual-inertial odometry algorithms for flying robots," Memory, 2018, (8 pages).
D. T. Tertei, J. Piat, and M. Devy, "Fpga design of ekf block accelerator for 3d visual slam," Computers and Electrical Engineering, Aug. 22, 2016 (22 pages).
G. Loianno et al., "Estimation, control, and planning for aggressive flight with a small quadrotor with a single camera and imu," IEEE Robotics and Automation Letters, Nov. 2016 (8 pages).
Z. Zhang, A. Suleiman, L. Carlone, V. Sze, and S. Karaman, "Visualinertial odometry on chip: An algorithm-and-hardware co-design approach," Robotics: Science and Systems, 2017, (10 pages).
Critical Link, "MitySOM-A10S" retrieved from https://www.criticallink.com/wp-content/uploads/MitySOM-A10S-Processor-Datasheet.pdf, Sep. 10, 2018, (29 pages).

\* cited by examiner

| Data Elements per Cycle | | Mult (R) | M | N | P | Buffer Size (Data Elements) | | | Compute Cycles | | |
|---|---|---|---|---|---|---|---|---|---|---|---|
| $BW_A$ | $BW_B$ | | | | | A | B | C | 64x64x64 | 64x128x64 | 128x128x128 |
| 4 | 4 | 16 | 4 | 4 | 4 | 16 | 16 | 16 | 16384 | 32768 | 131072 |
| 4 | 4 | 32 | 8 | 4 | 8 | 16 | 32 | 64 | 8192 | 16384 | 65536 |
| 4 | 2 | 32 | 16 | 4 | 8 | 16 | 32 | 128 | 8192 | 16384 | 65536 |
| 2 | 2 | 32 | 16 | 2 | 16 | 4 | 32 | 256 | 8192 | 16384 | 65536 |
| 8 | 8 | 64 | 8 | 8 | 8 | 64 | 64 | 64 | 4096 | 8192 | 32768 |
| 4 | 8 | 64 | 8 | 4 | 16 | 16 | 64 | 128 | 4096 | 8192 | 32768 |

SELECTING DESIGN PARAMETERS

FIG. 4

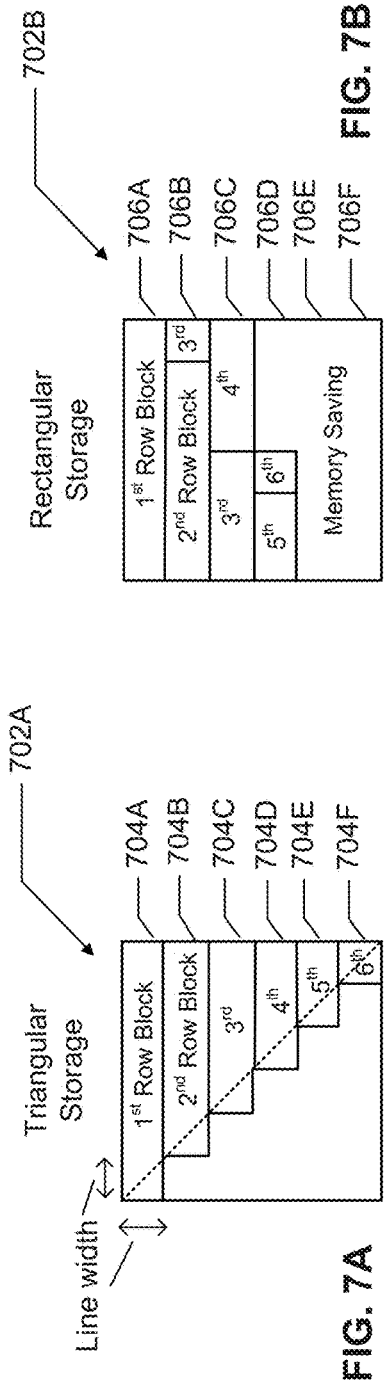
FIG. 7A
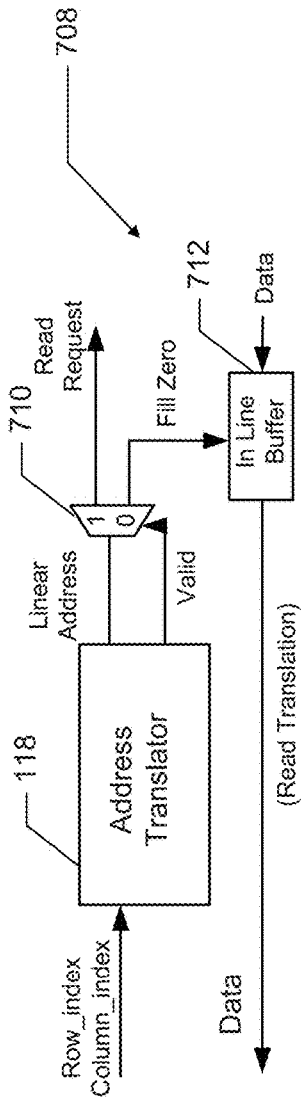
FIG. 7B
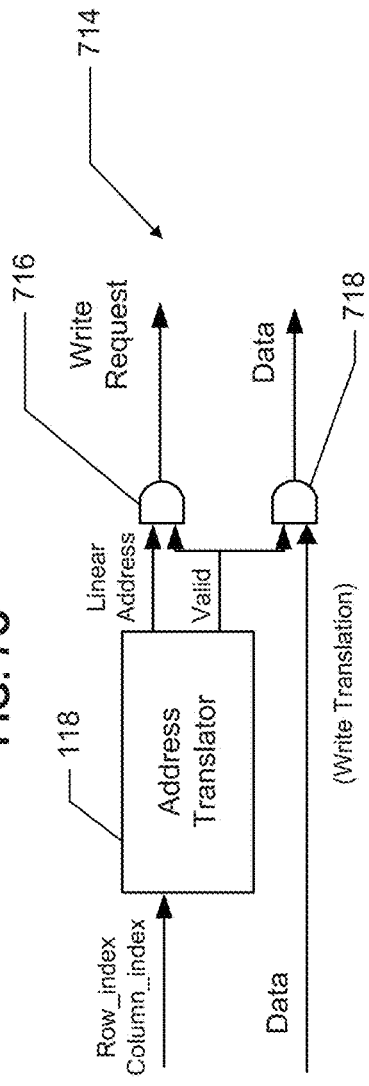
FIG. 7C
FIG. 7D

METHODS, APPARATUS, ARTICLES OF MANUFACTURE TO PERFORM ACCELERATED MATRIX MULTIPLICATION

RELATED APPLICATION(S)

This patent claims the benefit of and priority to U.S. Provisional Application Ser. No. 62/994,211 (and the appendices thereto), which was filed on Mar. 24, 2020, and is entitled "METHODS, APPARATUS, ARTICLES OF MANUFACTURE TO PERFORM ACCELERATED MATRIX MULTIPLICATION." U.S. Provisional Application Ser. No. 62/994,211 (and the appendices thereto) is incorporated herein by reference in its entirety.

FIELD OF THE DISCLOSURE

The present disclosure relates generally to matrix multiplication and, more particularly, to methods, apparatus and articles of manufacture to perform accelerated matrix multiplication.

BACKGROUND

Many of today's latest technologies operate on very large sets of raw data to provide a desired output. The very large datasets are typically arranged in matrices and the matrices are manipulated as needed to generate the output. One such manipulation is matrix multiplication, an operation by which two or more matrices are multiplied together.

BRIEF DESCRIPTION OF THE DRAWINGS

FIG. 4 is a table illustrating the characteristics of the example matrix multiply system when different design parameters are selected.

FIG. 7A illustrates an example memory in which data elements of a matrix are stored in either an upper or lower portion of the memory.

FIG. 7B illustrates an example memory in which data elements of a matrix are stored as data blocks in rows.

FIG. 7C is a first example address translator circuit for performing a read operation on a matrix stored in either an upper portion or a lower portion of the memory of FIG. 7A.

FIG. 7D is a second example address translator circuit for performing a write operation on a matrix stored in either an upper portion or a lower portion of the memory of FIG. 7A.

Figure 1:
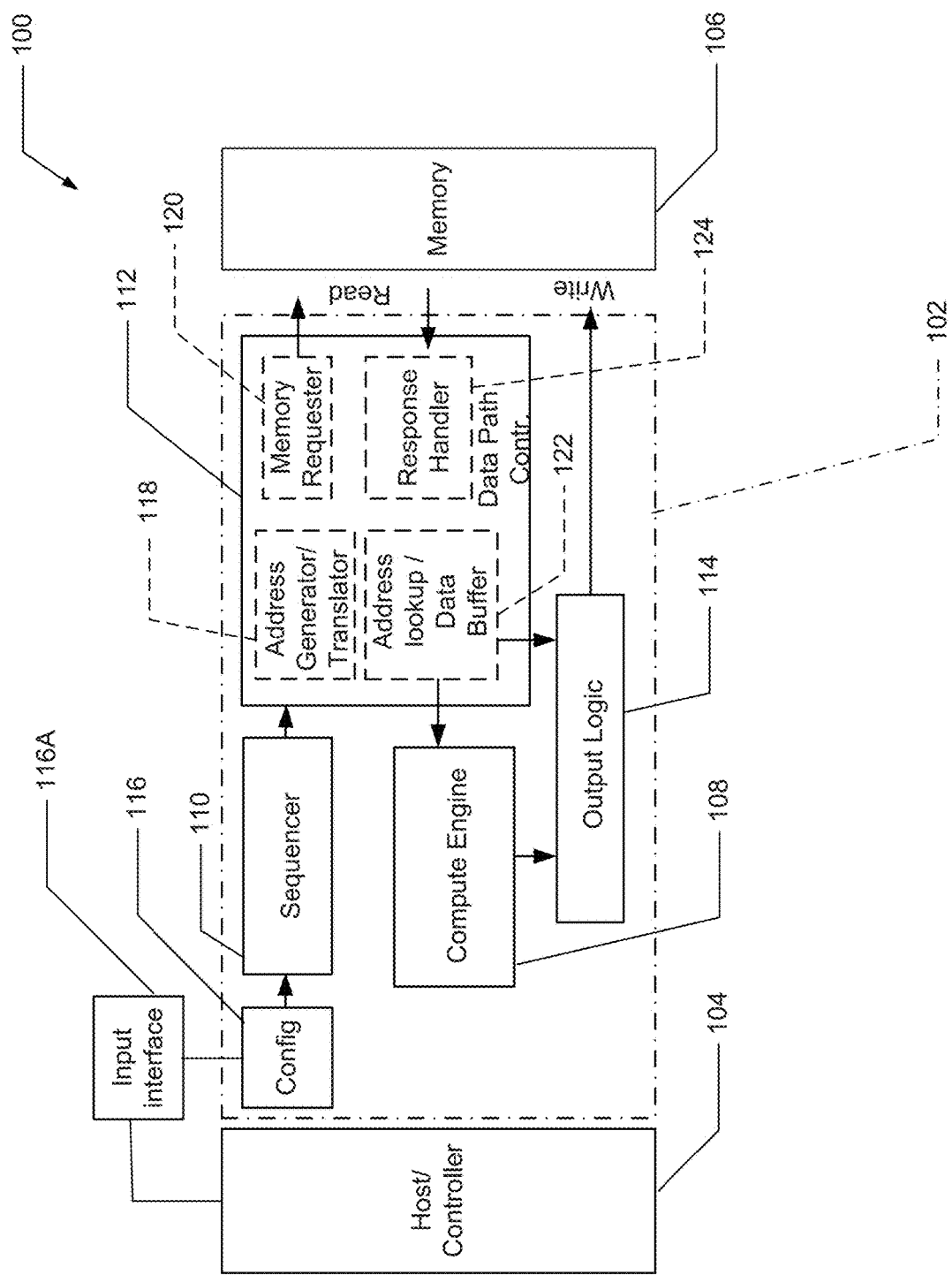
FIG. 1 is a block diagram of an example matrix multiply system for use in multiplying matrices in accordance with the teachings of this disclosure.

The figures are not to scale. In general, the same reference numbers will be used throughout the drawing(s) and accompanying written description to refer to the same or like parts, elements, etc. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Descriptors "first," "second," "third," etc., are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

A variety of real-world technologies operate on very large data sets to obtain a desired output. However, manipulating very large data sets is often expensive in terms of energy consumption, chip space, and execution time. As a result, technologies that perform matrix operations such as, matrix multiplication, are often ill-suited to applications that have strict time, space and/or energy constraints.

Many emerging technologies are being deployed in energy-constrained (e.g., battery powered), thermally restrained (e.g., fan-less small enclosed form factor), weight sensitive, low-cost embedded platforms with limited compute budget. These constraints introduce unforeseen challenges to technologies that rely on matrix multiplication. To address these challenges, example hardware accelerator engine architectures disclosed herein, along with a low power host micro-controller and memory, perform accelerated matrix multiplication while using less energy, less chip space, and while also achieving a low latency. As such, the example matrix multiply systems, methods, apparatus, and articles of manufacture disclosed herein can be incorporated into technologies that are required to produce output with low latency while remaining within the power and area budget affordable in deeply embedded system-on-a-chip (SoC) based edge applications.

Many popular and publicly available technologies that operate on large data sets need to be scaled down to a reduced set of algorithmic parameters so that they are able to fit within the computational budget of the underlying hardware architecture. However, real world applications that are scaled down to use a reduced set of algorithmic parameters experience: 1) reduced precision and robustness, and/or 2) increased constraints on other essential compute needs of the technology.

Some existing methods to perform matrix multiplication operate on only a portion of a data matrix. The portion of the data matrix is generated by dividing the data matrix (to be processed) into smaller matrices (e.g., referred to as tiles or data tiles or data blocks). However, when a tile-based method is used, partial tiles are generated during operation of the matrix multiplier. Such partial tiles cannot be consumed immediately (e.g., in the same clock cycle in which they were generated) and thus have to be stored until a next data tile/block is processed. Some solutions use a buffer or scratchpad to hold the partial tile and even place the buffer or scratchpad near to the matrix multiply engine to save latency. Unfortunately, just the need to read and write the data to and from the buffer/scratchpad alone expends significant energy and also ends up adversely impacting latency. As a result, designing a matrix multiplier to include a buffer or scratchpad that is spatially near the matrix multiply engine is not sufficient to offset the difficulties of handling partial tiles.

A matrix multiply engine can be implemented using a CPU that is executing threads. Unfortunately, using a CPU-based method to implement the matrix multiply engine involves continuous monitoring of the threads and the continuous feeding of data to the matrix multiply engines (compute units) including large cross-core overheads. In addition, CPU-based methods to perform matrix multiplication use allocation renaming and are configured to identify any data dispatches that are out of order. Allocation renaming and identifying data dispatches that are out of order are power hungry operations. CPU based methods are also power hungry because the CPU is not permitted to enter lower power states (due to the need to continuously monitor threads and feed data). As a result, CPU-based methods to implement a matrix multiply engine are not suitable in deployments having high energy efficiency requirements.

A systolic array architecture can also be used to implement a matrix multiply engine. However, such systolic array based matrix multipliers experience data mapping challenges and low kernel size CNNs that result in lower computer utilization. Further, systolic array based systems, by using single-cycle accumulation methods, do not lend themselves to performing floating point operations at higher frequencies over large compute blocks.

Matrix multiply engines can also be implemented using graphic processing units. But such matrix multipliers have significant baseline hardware overheads and are therefore not well suited for lower power and form factor applications because of the need to achieve very large parallelism.

Some matrix multiply engines include an Extended Kalman Filter (EKF). Such designs can achieve low latency and offer other advantages. However, such designs would benefit further from an additional decrease in latency, a more efficient usage of space (e.g., a smaller footprint), and faster processing speeds.

The operations performed by a matrix multiplier are represented herein as a scaled multiplication of two matrices, with a possible offset by a third matrix, which can be represented mathematically as Coutput=$\alpha \cdot (A \times B) + \beta \cdot$Cinput. The A, B and Cinput and Coutput variables each represent a matrix. The $\alpha$ variable operates to scale the multiplication of the A matrix by the B matrix, "(A×B)," and the $\beta$ variable operates to blend the Cinput matrix.

Examples disclosed herein can be used as part of a hardware-software co-design approach. In particular, the accelerated matrix multiplier disclosed herein can be embedded in an application that relies on software algorithms to perform most operations but uses the hardware aspects disclosed herein to perform the matrix multiplication and thereby generate output at a high rate of speed and in a power and space efficient manner.

Example apparatus disclosed herein are implemented using an example matrix multiply accelerator engine that includes dedicated hardware and software to perform matrix multiply functions faster than such functions can be performed on a CPU. As disclosed herein, the example accelerator matrix multiplier engine enhances compute, data movement, bandwidth and dynamic power to deliver high quality output data at low latency and with a low rate of power consumption. In some examples, the accelerator engine can be used in power and cost/budget constrained devices/applications including the types of devices/applications deployed at the edge of a network (e.g., drones, unmanned aerial vehicles, head-mounted displays, audio recognition/video recognition device, etc.).

An example accelerator matrix multiply engine disclosed herein offloads the computation of linear algebra algorithms from a CPU to hardware-software design thereby enabling the usage of devices that operate at a high sample rate. Increasing the operating speed of a data processing pipeline by deploying the example accelerator matrix multiply engine disclosed herein further serves to increase the precision and robustness of output data generated by such a data processing pipeline. Further, the deployment of the example accelerator matrix multiply engines disclosed herein aid in reducing any drift that might be introduced by sensors associated with the data processing pipeline. Also, example accelerator matrix multiply apparatus, methods and articles of manufacture disclosed herein have a small silicon footprint, a modest on-chip shared SRAM, and can achieve a speed greater than ten times that of a software-only implementation while consuming as little as 2.2 mW power.

Example methods, apparatus and articles of manufacture disclosed herein provide dedicated matrix multiply functionality and achieve power, performance, area, and bandwidth efficiency across multiple designs. Some example apparatus, methods and articles of manufacture disclosed herein include (or utilize) a matrix multiply engine designed using a micro-architecture and intended to operate within an EKF. Some such example matrix multiply engines disclosed herein are coupled to or otherwise in communication with a host/micro-controller and a memory. Further, example matrix multiply engines disclosed herein include example compute engines (e.g., core compute units) having multipliers (also referred to herein as multiplier nodes and/or compute nodes) and adders (also referred to herein as adder nodes). In some examples, the multiplier nodes are arranged in a two dimensional array of multipliers, and a reduction tree of adders is associated with each column of the array. Also, example compute engines include a broadcast interconnect to provide first operand data to multiplier nodes arranged in a row of the two dimensional array/grid. Using the broadcast interconnect in this manner allows for spatial reuse of the first operand data. Some example compute engines disclosed herein also include a unicast interconnect to provide second operand data to the multiplier nodes. In some examples, the second operand data is replaced with newly-generated second operand data after an example number (e.g., a few) of clock cycles. Providing the second operand data in this manner allows for temporal reuse of the second operand data. Example compute engines disclosed herein also include a multi-channel n-stage accumulator for partial accumulation of output data output by the two dimensional array/grid with an accumulation circuit capable of performing bubble free accumulation with high-speed, multi-staged floating point adders. Bubble-free accumulation means that the multi-channel n-stage accumulator is capable of processing valid data in every clock cycle (e.g., with zero idle cycles).

Example matrix multiply engines disclosed herein further include an example data path controller having an on-the-fly cache-based computation unit in a response handler. In some examples, the on-the-fly-cache based computation unit can transpose a matrix. The example data path controller, in some examples, further includes a cache for the first operand data and a data buffer to hold the second operand data. An example sequencer included in the example matrix multiply engines prepares the data to be used as the operands by dividing a larger input matrix into the smaller matrices referred to as tiles. In some examples, the sequencer also operates to schedule the work of the data path controller and the compute engine so that data is supplied by the data path controller to the compute engine in a timely manner.

Example matrix multiply engines disclosed herein provide many advantages. For example, registers/buffers of the multi-channel n-stage accumulator included in the matrix multiply engines store partial output matrices of data and are located near the compute engine in the microarchitecture. The ability to store partial output matrices in the registers/buffers without the need to transfer the partial output matrices to and from a memory, as well as the placement of the registers/buffers near the compute engine both improve the performance of the matrix multiply engine when operating on larger matrices as described further below. In addition, these buffers are located near to adder logic of the final accumulator stage, so that data can be latched in an immediate clock cycle of execution. Thus, data in these buffers can be accessed within one clock cycle delay from the compute engine. In comparison, external memory is typically multiple cycles away from the compute engine/compute core. In addition, the sequencer, which is integrated in the matrix multiply engine, eliminates the need for CPU intervention thereby further enhancing the performance of the matrix multiply engine. The example matrix multiply engine disclosed herein also performs in-place transpose/computation of the first and second operands and performs blending and scaling operations for single precision general matrix multiplication ("SGEMM"). As a result of using in-place transpose/computation, the matrix multiply engines require less storage because any intermediate results generated during the multiplication operations need not be stored but instead remain in place. Both of these operations reduce the amount of memory required as well as a number of memory accesses performed by the matrix multiply engine and thereby result in further power saving and faster operating speeds.

Additional advantages of the matrix multiply engine disclosed herein are effected through the use of compact storage for special types of matrices. The compact storage results in a smaller memory footprint and decreased power consumption. Example intelligent walking patterns (i.e., half compute, diagonal compute, etc.) performed by the example matrix multiply engine also help to avoid unnecessary compute operations while reducing latency and power consumption. Additionally, the example micro-architecture of the example multi-channel N stage accumulation technique performed by the matrix multiply engine provides design scalability for pushing frequency (e.g., increasing the frequency bandwidth, as needed to perform in a wide range of design configurations and applications). The ability to push the clock frequency is achieved by reducing a delay of a combinatorial path.

Turning now to the figures, FIG. 1 is a block diagram illustrating an example matrix multiply system 100. In some examples, the matrix multiply system 100 includes an example micro-architecture of an example matrix multiply engine 102 (also referred to as "a matrix multiply"), an example host/micro-controller 104, and an example memory 106. In some examples, the matrix multiply engine 102 operates to multiply matrices of data and includes an example compute engine 108, an example sequencer 110, an example data path controller 112, an example output logic 114, an example configurer 116 and an example input interface 116A. In some examples, the data path controller 112 includes an example address generator 118, an example memory requester 120, an example address based lookup (ALU)/Data Buffer 122, (also referred to as an address lookup/data buffer(s) and an example response handler 124.

In some examples, the example configurer 116 uses configuration data (entered by a user at an example input interface 116A or generated automatically by the matrix multiply system 100) to set any of a variety of design parameters including, for example, a size of the matrices to be processed by the example compute engine 108. The example sequencer 110 prepares the data stored in the example memory 106 to be used as example first and second operands by dividing a larger input matrix into smaller matrices referred to as tiles, as described above. In some examples, the memory 106 can be implemented using a modest on-chip shared static random access memory storage (SRAM). In some examples, the sequencer 110 also operates to schedule the work of the data path controller 112 and the compute engine 108 to ensure that the tiles of data are supplied by the data path controller 112 to the compute engine 108 in a timely manner. The example compute engine 108 multiplies the tiles extracted from the memory 112 by the data path controller 112 and supplied to the compute engine 108. The compute engine 108 generates a full output matrix and supplies the full output matrix to the example output logic 114 which operates to scale and blend the example full output matrix. The output logic 114 supplies the resulting scaled and blended full output matrix to the memory 106 for storage therein.

As described above, in some examples, the matrix multiply system 100 is embedded in any of a numerous variety of suitable applications/devices to generate output data. In some such examples, the matrix multiply engine 102, having the example compute engine 108, the example sequencer 110, the example data path controller 112, the example output logic 114, the example configurer 116, and the example input interface 116A operates to multiply matrices within the application/device.

Figure 2:
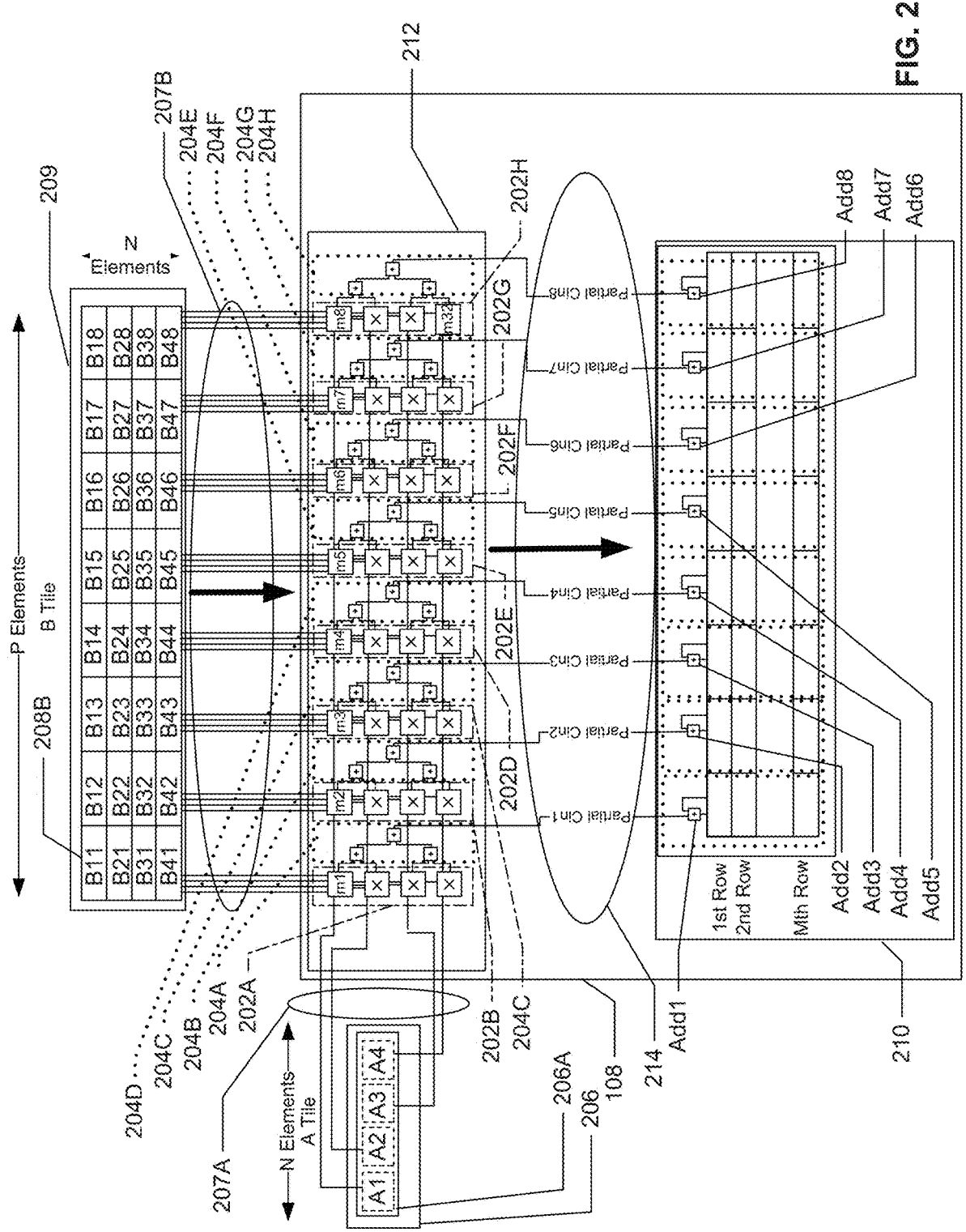
FIG. 2 is a block diagram of an example compute engine of the matrix multiply system of FIG. 1

Referring now to FIG. 2, FIG. 2 provides a block diagram of the example compute engine 108 as well as portions of the example ALU/data buffer 122. In some examples, the compute engine 108 is implemented as a core compute unit having example columns of multipliers 202 (including a first column of multipliers 202A, a second column of multipliers 202B, a third column of multipliers 202C, a fourth column of multipliers 202D, a fifth column of multipliers 202D, a sixth column of multipliers 202E, a seventh column of multipliers 202F, and an eighth column of multipliers 202G in the illustrated example, where the columns of multipliers 202 are, in some instances, collectively referred to herein as the multipliers 202), and example adder trees (including a first adder tree 204A, a second adder tree 204B, a third adder tree 204C, a fourth adder tree 204D, a fifth adder tree 204E, a sixth adder tree 204F, a seventh adder tree 204G, and an eighth adder tree 204H in the illustrated example, collectively referred to herein as the adder trees 204). For illustrative purposes only, the top multiplier in each of the eight columns is numbered m1-m8, respectively, and a bottom-most and left-most multiplier is numbered m32. Each of the remaining multipliers are numbered according to the scheme identified with respect to multiplier m1-m8 such that the last multiplier is number multiplier m32. In some such examples, each column of adders is associated with a corresponding one of the columns of multipliers.

In some examples, the compute engine 108 further includes a multi-channel n-stage accumulator 210 having an example set of M registers (see FIG. 5) associated with different stages of the accumulator 210. Thus, the M accumulator registers also referred to as an array of registers (e.g., 1st Row Acc Reg, 2nd Row Acc Reg, . . . , Mth Row Acc Reg) in FIG. 5. can jointly hold a total of M rows of elements where each row contains P elements. Further each of the P accumulators includes an adder (e.g., represented as Add1, Add2, Add8 in FIG. 2, such that P=8). As will be described further below in connection with FIG. 5, each of the columns of the accumulator 210 (drawn within a dotted rectangle in FIG. 5) represents a different channel of the multi-channel n-stage accumulator 210.

Referring to the compute engine 108, in some examples, the columns of multipliers 202 each have four rows, and each row of each column contains one multiplier. Thus, the columns of rows and multipliers form a two dimensional array/grid 212. In the example array/grid 212, individual ones of the multipliers 202 included in each of the eight columns of multipliers 202A, 202B, 202C, 202D, 202E, 202F, 202G, 202H are placed at the array locations of the two dimensional array/grid 212, thereby populating the two dimensional array/grid 212 (also referred to herein as the "array/grid" 212). In some examples the eight adder trees 204 are arranged to form reduction trees that sum outputs produced by the corresponding columns of multipliers located in the P (e.g., 8) columns of the array/grid 212. Although, the example two-dimensional array/grid 212 of FIG. 2 includes eight columns and four rows, any other number of columns and/or rows can instead be used.

Figure 3:
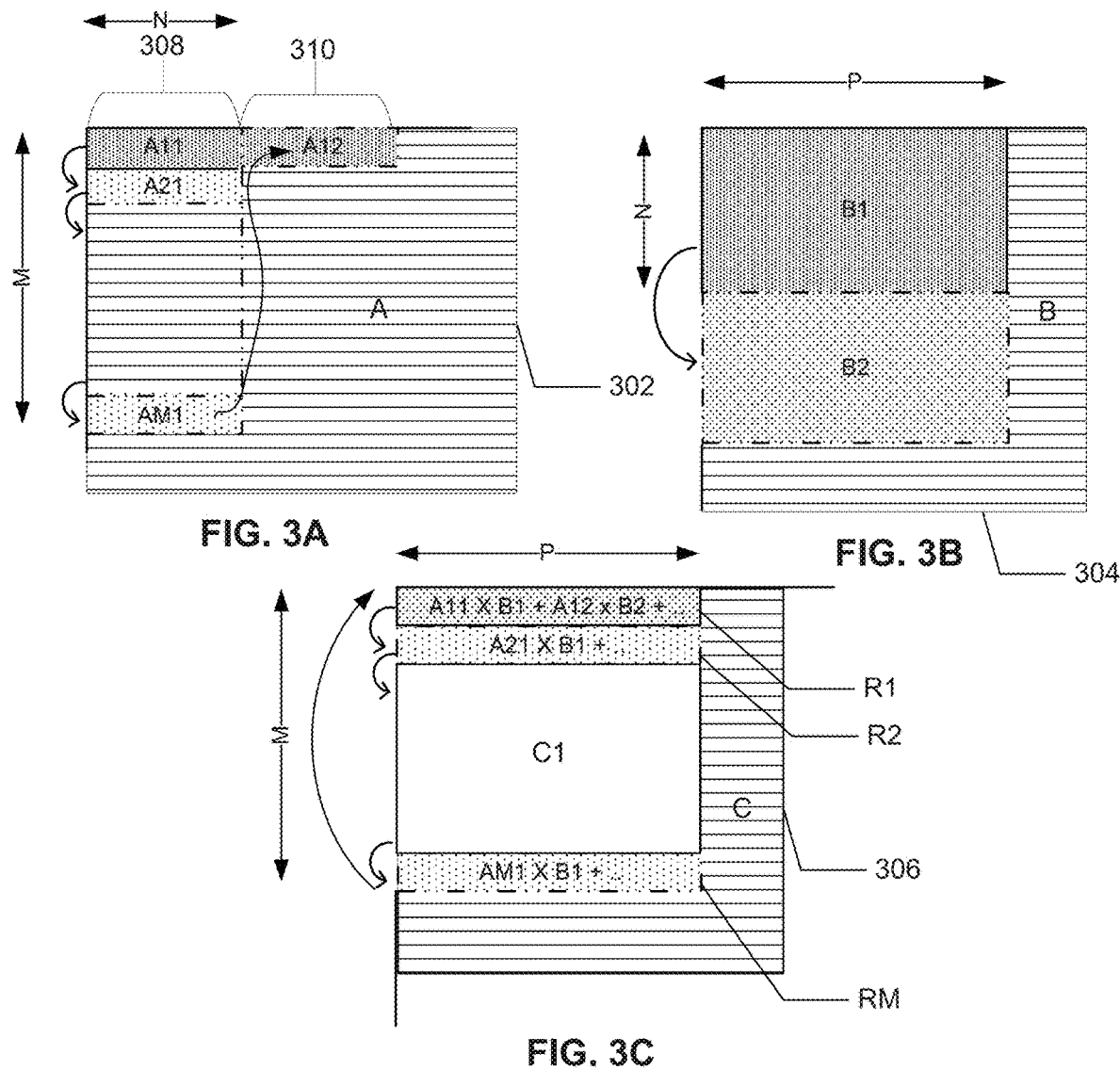
FIGS. 3A, 3B and 3C illustrate an example A matrix, an example B matrix and an example C matrix, respectively.

The example compute engine 108 is provided with two sets of input operands from the data path controller 112. A first of the two sets of input operands is stored in the example cache 206 and is arranged as an example first tile referred to as the A Tile 206A. A second set of the two sets of input operands is stored in the example buffer 208 and is arranged in an example second tile referred to as the B Tile 208B. In some examples, the cache 206 and the buffer 208 are included in the data path controller 112. In some such examples, the cache 206 and the buffer 208 included in the data path controller 112 can be included in the address lookup/data buffer 122. In some examples, the A Tile 206A is a one dimensional matrix formed in a row of N elements, where the value of N can be set to any desired value. In the illustrated example of FIG. 1, N is equal to 4. The four data elements of the A Tile 206A are also referred to as a first example tile of data where the tile of data is a sub-matrix of data extracted from a larger A matrix of data (see FIG. 3A). Thus, the A Tile 206A is a sub-matrix of a larger A matrix. In the block diagram of FIG. 1, because N=4, the A Tile 206 includes a first example element A1, a second example element A2, a third example element A3 and a fourth example element A4. In some examples, the B Tile 208B is a two dimensional matrix formed of P columns and N rows, where the value of P can be set to any desired value. In the illustrated example of FIG. 1, P is equal to 8 (e.g., P=8). The data elements arranged to form the B Tile 208B are part of a larger B Matrix (see FIG. 3B). In the block diagram of FIG. 1, because P=8 and (as stated above), N=4, the B Tile 208B includes example elements identified by reference numbers formatted as Bnp wherein B represents the name of the matrix containing the element, n represents the row number of the element, and p represents the column number of the element. Thus, the B Tile 208B includes, a first example element B11, a second example element B12, a third example element B13, a fourth example element B14, a fifth example element B15, a sixth example element B16, a seventh example element B17, an eighth example element B18, and so forth.

During operation of the compute engine 108, the example first input operands (e.g., the data elements of the example A Tile 206A) and the example second input operands (e.g., the data elements of the example B Tile 208B) are provided to the two dimensional array/grid 212. As described above, the two dimensional array/grid 212 includes the example eight columns of multipliers 202A, 202B, 202C, 202D, 202E, 202F, 202G, 202H) and each of the columns of multipliers is associated with a corresponding one of the example eight corresponding columns of adders 204A, 204B, 204C, 204D, 204E, 204F, 204G, 204H). The two dimensional array/grid 212 processes all the supplied A tile 206 and B Tile 208B data elements during a same clock cycle to generate an input matrix (referred to as "Cinput Matrix" 214). Although the Cinput Matrix 214 is an output tile generated by the two dimensional array/grid 212 of multipliers and adders, the output of the two dimensional array/grid 212 is supplied as an input to the example multi-channel N-stage accumulator 210, such that the Cinput Matrix 214 is referred to as an input matrix and not an output matrix. For illustrative purposes, the Cinput Matrix 214 is shown as a set of outputs of the two dimensional array/grid 212 (Partial Cin1, Partial Cin2, Partial Cin3, Partial Cin4, Partial Cin5, Partial Cin6, Partial Cin7, and Partial Cin8). The data of the Cinput Matrix 214 is not stored in any intermediary storage but is instead supplied directly to the multi-channel n-stage accumulator 210. The data elements included in the Cinput Matrix 214 are accumulated and managed by the multi-channel n-stage accumulator 210, as described below in connection with FIGS. 3A, 3B, 3C and FIG. 5. In some examples, as further described below in connection with FIGS. 3A, 3B and 3C, the first input operands (e.g., the example data elements of the example A Tile 206A) and the second input operands (e.g., the example data elements of the example B Tile 208B) are fetched (as tiles) from the example memory 106 (see FIG. 1) by the example data path controller 112 (see FIG. 1) before or at the start of a clock cycle. In some examples, the fetched data includes 2×N×P data elements. As described above, N is equal to the number of elements included in the A Tile 206A and also represents the number of rows included in the B Tile 208B, where N represents any desired value; whereas P represents the number of data elements included in a row of the B Tile 208B, and also represents any desired value.

Referring still to FIG. 2, during a clock cycle, each of the different elements of the A Tile 206A is broadcast via a first interconnect(s) 207A (also referred to as a broadcast interconnect 207A) to each of the multipliers 202 included in a different row of the two-dimensional array/grid 212, such that, assuming N is equal to 4, the first element A1 of the A Tile 206A is supplied to each multiplier in the first row of the two dimensional grid/array 212, in some examples, at a same time. Likewise, the second element A2 is supplied to each of the multipliers 202 in the second row of the two dimensional grid/array 212, in some example, at a same time, and so forth until each multiplier in a same row of the two dimensional grid is supplied a same one of the elements of the A Tile 206A, and none of the multipliers included in any one of the rows of the A tile 206A is supplied a same one of the elements of the A Tile 206A supplied to any other row of the two dimensional array/grid 212.

Additionally, in some examples, the elements in the example B Tile 208B are each supplied (via a unicast operation) to a unique one of the example multipliers m1-m32 via a second interconnect 207B (also referred to as a unicast interconnect 207B) of the two dimensional array/grid 212. In some such examples, the element located at B11 of the B Tile 208B is supplied to the first multiplier m1 located at a first location of the two dimensional array/grid 212. Likewise, the element located at B12 of the B Tile 208B is supplied to the second multiplier M2, and so forth until all the multipliers 202 of the two dimensional array/grid 212 have been supplied a unique one of the elements of the B Tile 208B. After supplying the first set of operands 206A and the second set of operands 208B to the multipliers 202 in the manner described, the multipliers 202 operate to multiply the operands as supplied. Thus, the first element A1 of the A Tile 206A is multiplied by each element contained in the first row of the B Tile 208B (e.g., B11, B12, B13, B14, B15, B16, B17, B18), the second element A2 of the A Tile 206A is multiplied by each element contained in the second row of the B Tile 208B (e.g., B21, B22, B23, B24, B25, B26, B27, B28), and so forth.

The multiplication operation performed by each multiplier 202 results in a dot product of an element of the A Tile 206A and an element of the B tile 208B. The dot products are supplied to the tree adders 204 which operate to generate a reduced sum output. In some examples, the dot product generated by each individual multiplier 202 in the first row of the two dimensional array/grid 212 is added to the dot product generated by each individual multiplier in the second row and same column of the corresponding multiplier 202 in the first row of the two dimensional array/grid 212. Likewise, the dot product generated by each individual multiplier in the third row of the two dimensional array/grid 212 is added to the dot product generated by each individual multiplier in the fourth row and same column of the corresponding multiplier 202 in the third row of the two dimensional array/grid 212. The output of the two adders in a same column are summed at a third adder, also contained in the same one of the columns of adders (204A-204H). The data at the output of each of the third adders (of each column) together represents a single row of P elements of the example Cinput Matrix 214. The individual ones of elements of the Cinput Matrix 214 are supplied directly to the corresponding inputs of the multi-channel n-stage accumulator 210.

Referring still to FIG. 2, as discussed above, the example compute engine includes one of the eight example multipliers 202A, 202B . . . , 202H, at each location of the two dimensional array/grid 212 and includes example columns of adders 204A, 204B, . . . , 204H, arranged to form a reduction tree. Thus, each column of the two dimensional array/grid 212 includes N multipliers and (N−1) adders. Further, as described above, the data is supplied from the A Tile 206A and the B Tile 208B in a manner such that the calculations performed by each column of the multipliers 202A, 202B, . . . , 202H results in a dot product of (1×N) elements from the A Tile 206A and (N×1) elements from the B Tile 208B. Thus, each of the N elements of the A Tile 206A, once fetched, is used as an operand with each of the P elements of the B Tile 208B. As a result, the number of re-fetches that need to be performed on the elements of the A Tile 206A is reduced by a factor of (1/P). Reducing the number of re-fetches of the elements of the A tile 206A by a factor of 1/P improves performance of the matrix multiplier architecture and results in less energy consumption that would otherwise be needed to perform re-fetches.

To reduce the number of B Tile 208B accesses that are performed when operating the two dimensional array/grid 212 and thereby reduce the time to generate an example Cinput Matrix, the elements of the B Tile 208B are reused across M cycles, where M can be equal to any desired value using the example configurer 116 (see FIG. 1). In some examples, the elements of the B Tile 208B are held in the buffer 208 until the elements of the B Tile 208B have been multiplied with each of the A Tiles 206A which thereby reduces the number of times that the B Tile 208B is fetched. New B tile data 208B is only selected every M clock cycles so that M rows of P output elements (equal to the dot product of A and B) and summed by the adders during a total of M clock cycles and each rows of P elements forms the Cinput Matrix 214. Thus, the number of elements generated by the two dimensional array/grid 212 (during M clock cycles) is equal to M×P elements.

However, the row of P elements generated by multiplying a single A tile 206A (as opposed to all of the A Tiles that together form the larger A matrix) with a single B Tile 208B (as opposed to all of the B Tiles that together form the larger B matrix) results in a partial matrix (e.g., Cinput Matrix 214). As discussed above, having to write and later read each of the partial tiles can have a significant, adverse impact on memory bandwidth. To avoid having to write and read partial output tiles, the row of P elements of the Cinput Matrix 214 generated during each of the M clock cycles is provided directly to example local registers/data-buffers (see FIG. 5) for use by the multi-channel n-stage accumulator 210 and/or to, for example, an input stage 504 of the multi-channel n-stage adder 144 (see FIG. 5)

Referring now to FIGS. 3A, 3B, and 3C, FIG. 3A illustrates an example full A Matrix 302 containing multiple A tiles 206A (e.g., Tile A11, Tile A21, Tile A12, Tile AM1, etc.), FIG. 3B illustrates an example full B Matrix 304 (containing multiple B tiles 208B (e.g., Tile B1 and Tile B2), and FIG. 3C illustrates an example full output Coutput Matrix 306. As described above, each of the M rows of output data generated by the two dimensional array/grid 212 are supplied as input to the example multi-channel N-stage accumulator 210 (see FIG. 2). As can be seen in FIGS. 3A and 3B, the full A matrix 302 and the full B matrix 304 have been divided into individual tiles of data. The individual tiles are sub-matrices of the corresponding larger matrices (e.g., the full A Matrix 302 and the full B Matrix 304). As used herein, a tile is a partial tile and a matrix is a partial matrix unless the matrix or tile is described as a "full" matrix or a "full" tile or a "full output" matrix. As a tile or partial tile is also a type of matrix, in some instances below, a partial tile may be referred to as a partial matrix. In general, the tiles prepared by the sequencer are referred to as tiles and any output data generated during an intermediate operation or final operation of the compute engine is referred to as a matrix (either an input matrix or an output matrix).

As further shown in FIG. 3A, the full A matrix 302 can have any number of rows of data (e.g., M) and any number of columns, and each A tile 206A (e.g., the first tile 308, the second tile 310, etc.) of the full A matrix 302 includes 1 row and a number (e.g., N) of data elements corresponding to N columns. Further, as shown in FIG. 3B, each of the B tiles 208B (the first B Tile B1 and the second B Tile B2) can have any number of rows of data (e.g., N), and any number of columns (e.g., P). However, the number of columns in the A tiles 206A is to be the same as the number of rows of the B tiles 208B to enable generation of a valid output matrix Coutput Matrix 306.

Referring now to FIG. 3C, in some examples, an example first output tile C1 214C generated by the output of the multi-channel n-stage accumulator includes P data elements and is equal to the product of the tile A11 and the tile B1 added to the product of the tile A12 and the tile B2, and so forth. Similarly, the second row of the first output Matrix C1 214C is equal to the product of the tile A21 and the tile B1 added to the product of the tile A22 and the tile B2, and so forth. Thus, a first row of the first output matrix, Coutput Matrix 214, contains (A11×B1+A12×B2+ . . . ) and a second row of the output Tile C contains (A21×B1+A22× B2+ . . . ). The remaining rows of the M rows generated by the multi-channel n-stage accumulator 210 are calculated in a similar manner (e.g., a sum of the dot products of the A tiles 206A by the B tiles 208B). In some examples, the C tiles of the C Matrix 306 are generated by selecting partial A tiles (from the A matrix) for multiplication in a row order and selecting partial B tiles (from the B Matrix) in a column order such that all of the A tiles in the first row are selected before the A tiles of the second row and all of the B tiles in a first column are selected before the B tiles in a second column. Thus, the operation proceeds by iterating over the A tiles of the A matrix in row order and iterating over the B Tiles of the M matrix in column order.

The values of N, P and M are determined based on the characteristics of the design of the matrix multiply system 100. In some examples, the sustainable bandwidth for matrix A is $BW_A$ elements per cycle, the sustainable bandwidth for matrix B is $BW_B$ elements per cycle, and the number of multipliers 202 (and equivalent adders) that the design could have is represent by the value CR.' Although in the compute engine 108 there are four multipliers 202 for every three adders 204, there is also an adder associated with each channel of the multi-channel n-stage accumulator 210 such that the number of adders is equal to the number of multipliers. In some examples, the value of R is dependent upon the number of multipliers included in the design. In some such examples, the design parameters (M, N, P) are chosen as follows: 1) $N=BW_A$; 2) $P=R/BW_A$; and 3) $M=R/BW_B$).

Referring now to FIG. 4, FIG. 4 provides a table 400 identifying, for given values of bandwidths for the A data interface, the B data interface, and a total number of multipliers (and equal number of adders), various design configurations (e.g., values for the variables P, M and N) and further projects a number of compute cycles and buffer requirements for A Tile, the B Tile and the output tile, Coutput Tile C.

Figure 5:
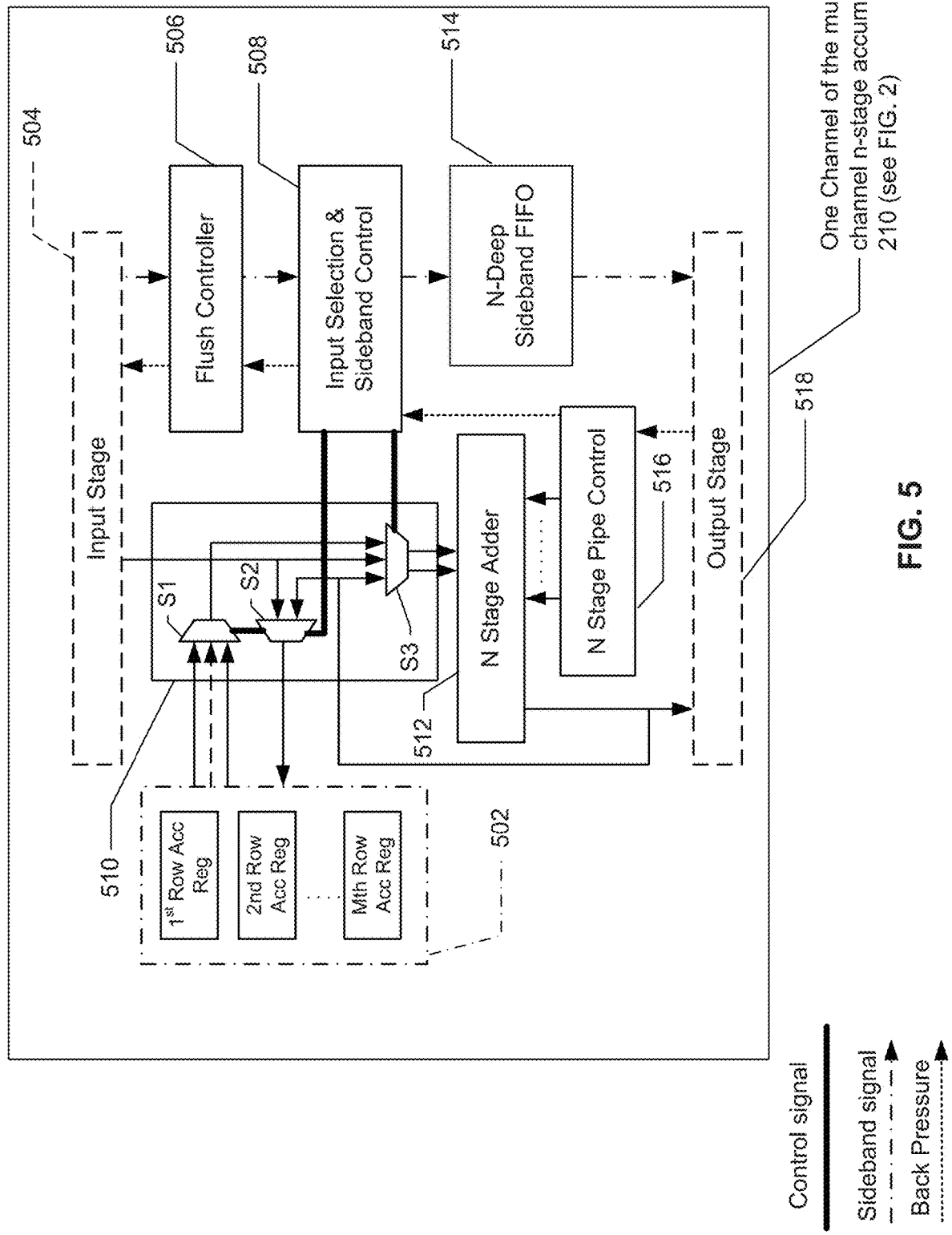
FIG. 5 is a block diagram of an example channel of the multi-channel n-stage accumulator of the compute engine of FIG. 1 and FIG. 2.

Referring now to FIG. 5, FIG. 5 is a block diagram of an example single channel of the multi-channel n-stage accumulator 210 of FIG. 2. In some examples, the value of "n" for the number of stages of the multi-channel n-stage accumulator is equal to P such that the multi-channel n-stage accumulator 210 includes P channels. The example multi-channel n-stage accumulator 210 of FIG. 5 can include example accumulator registers 502 (e.g., 1st Row Acc Reg, 2nd Row Acc Reg, . . . , Mth Row Acc Reg) arranged in an example array format (e.g., array 502). The example accumulator register array 502 is designed such that each row of the array 502 includes a different one of the accumulator registers (e.g., 1st Row Acc Reg, 2nd Row Acc Reg, . . . , Mth Row Acc Reg) and such that the array 502 includes a same number of rows (e.g., M) as are included in the partial C1 Tile of the Matrix C shown in FIG. 3C. The array is further configured such that the accumulator register (e.g., 1st Row Acc Reg, 2nd Row Acc Reg, . . . , Mth Row Acc Reg) form a single column 502 and the data stored in the accumulator registers (e.g., 1st Row Acc Reg, 2nd Row Acc Reg, . . . , Mth Row Acc Reg) of a same channel of the multi-channel n-stage accumulators 210 is supplied the data included in a single column of the tile generated by the two dimensional array/grid 212 (e.g., Cinput Matrix). As a result, each one of the example accumulator registers (e.g., 1st Row Acc Reg, 2nd Row Acc Reg, . . . , Mth Row Acc Reg) contains an "A×B" row element (e.g., partial "A×B" data value from a different row) of the Cinput Matrix generated by the two-dimensional array/grid 212. The example multi-channel n-stage accumulator 210 also includes an example input stage 504, an example flush controller 506, an example input selection and sideband controller 508, example selectors 510 (including a first example selector S1, a second example selector S2, and a third example selector S3), an example N-stage adder 512, an example N-deep sideband FIFO 514, an example N stage pipe controller 516, and an example output stage 518. In some examples, because P elements of A×B are produced every cycle, P channels of the multi-channel n-stage accumulator 210 are sufficient to process a set of M partial tiles to thereby generate the example a full (e.g., non-partial) C Matrix 306 (see FIG. 3C).

In some examples, the input selection and sideband controller 508 controls the first, second and third selectors 510 (S1, S2, S3). As illustrated, the first selector S1 receives M inputs where M corresponds to the number of registers included in the Acc Reg array 502. The input selection and sideband controller 508 causes one of the M inputs of the first selector S1 to be selected based on 1) whether there is a valid data from the input stage during that clock cycle, and 2) whether a valid output is available from the N stage adder 512. If there is valid data at the input stage but a valid output is not available from the N stage adder 512, then the Acc Reg corresponding to the input (from the input stage) having a row index (between 1 and M) is selected by the first selector S1 (provided that the relevant Acc Reg contains valid data). If instead, there is no valid data from the input stage during that cycle, but a valid output is available from the N stage adder 512, then the first selector picks one of the Acc Regs corresponding to the output of the N stage adder 512 (which, again, is a value between 1 and M). In the event that both valid data is available from the input stage during that clock cycle and a valid output is available from the N stage adder 512, the first selector S1 is no longer needed as the third selector S3 will not choose the output of the first selector S1.

The second selector receives two inputs including: a first input supplied by the input stage 504 and a second input supplied by the output of the N stage adder 512. The input selection and sideband controller 508 causes one of the two inputs to be selected as the output of the second selector S2 based on whether the operand from the output stage or the input stage 504 corresponds to a same row index. In some examples, the second selector S2 corresponds to a set of second selectors, and an output of each of the S2 selectors included in the set is coupled to corresponding ones of the accumulation registers (e.g., 1st Row Acc Reg, 2nd Row Acc Reg, . . . , Mth Row Acc Reg) of the array 502. Further, the first input of each of the set of second selectors S2 receives data from the example input stage 504 at a same time. As described above, one of the two inputs of one of the second selectors is selected as the output of one of the set of second selectors based on whether the operand from the output stage 518 or the input stage 504 corresponds to a same row index of the accumulator registers 502 (e.g., 1st Row Acc Reg, 2nd Row Acc Reg, . . . , Mth Row Acc Reg). If the accumulator register corresponding to any of the inputs (i.e., the input from the input stage 504 or the output from N-stage adder 512) is valid (i.e., contains a valid value), then a corresponding input (either an input from the input stage 504 or from the output stage 512) would not be supplied as an output of the one of the second selectors S2 to a corresponding one of the accumulator registers 502 (e.g., 1st Row Acc Reg, 2nd Row Acc Reg, . . . , Mth Row Acc Reg).

The third selector S3 receives a first input from the input stage 504, a second input from the output of the first selector S1 and a third input from the output of the N stage adder 512. In addition, the third selector S3 supplies two output values to the N stage adder 512. The input selection and sideband controller 508 ensures that, at any clock cycle, if two or more inputs (for the same row) are available, data is supplied to the example N-stage adder 512, otherwise no compute is performed by N Stage Adder (512) in that clock cycle." Associated pipe control logic of the N-stage pipe control 516 ensures fine-grained power gating. If all three inputs of the third selector S3 (for the same row) are available in any cycle, an input from the array of registers 502 and an output from the n-stage adder 512 are selected. After the last partials e.g., after completing the processing of the last column tile of Matrix A or the last row tile of Matrix B 212), inputs from the example input stage 504 are stalled and the n-stage adder 512 executes until the flush controller 506 has caused all registers of the register array 502 to be flushed to the output stage 518. Thus, the array of registers 502 store operands temporarily until another operand is available from either the input stage 504, or the output stage 518, and the input selection and side band control 508 considers the input stage 504, the output stage 518 or the temporarily stored operands in the array of registers 502 (the ACC Regs) when selecting two operands to be added together by the N stage adder 512. Thus, the array of registers 502 store operands temporarily until another operand is available from either the input stage 504, or the output stage 518, and the input selection and side band control 508 considers the input stage 504, the output stage 518 or the temporarily stored operands in the array of registers 502 (the ACC Regs) when selecting two operands to be added together by the N stage adder 512.

Figure 6A:
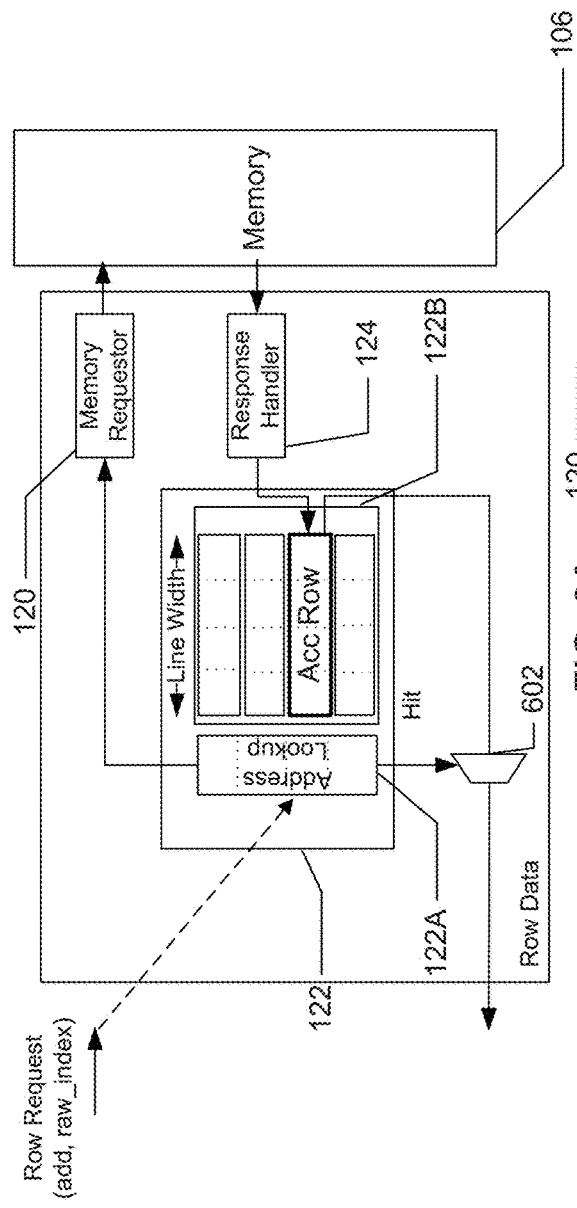
FIGS. 6A and 6B illustrate an example address bits based lookup data access system to be used in the matrix multiply system of FIG. 1 for accessing data elements stored in an array/grid format based on row information and based on column information, respectively.
Figure 6B:
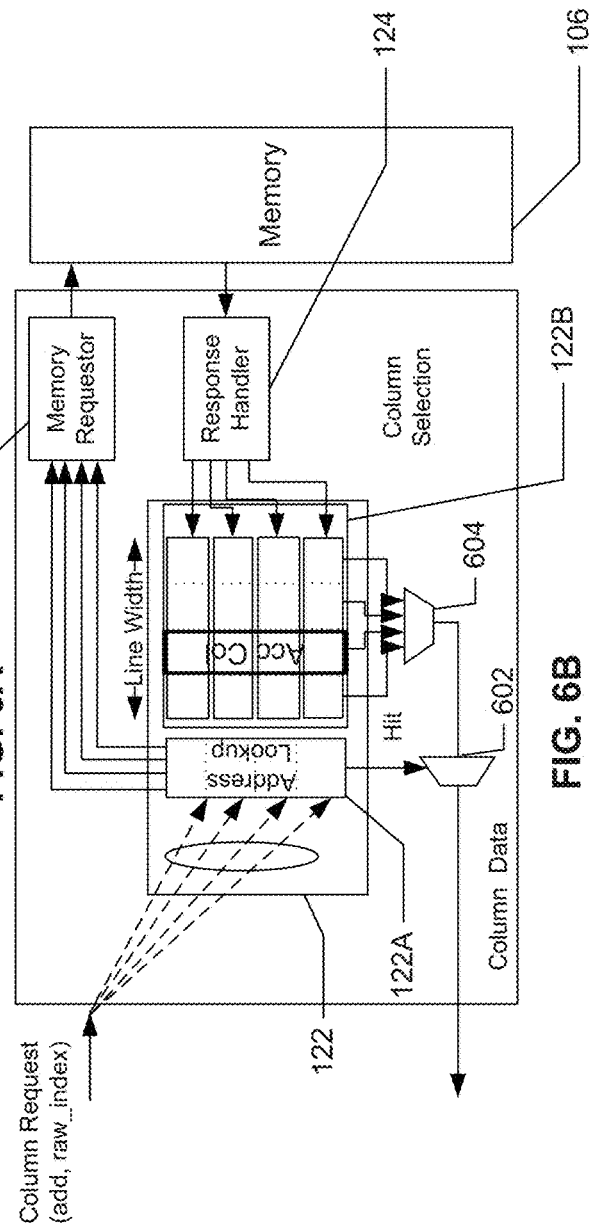

In some examples, when an output from the N-stage adder 512 is not available and the accumulator register (e.g., 1st Row Acc Reg, 2nd Row Acc Reg, . . . , Mth Row Acc Reg) corresponding to a row index of an input from the example input stage 504 contains a value that is also invalid (i.e., not present), then an output from one of the set of second selectors S2 is written/supplied to the corresponding one of the accumulator registers 502 (e.g., 1st Row Acc Reg, 2nd Row Acc Reg, . . . , Mth Row Acc Reg). In some examples, when an input from an input stage 504 is not available (i.e., is on hold) and the one of the accumulator registers of the array 502 corresponding to a row index of an output from the N-stage adder 512 contains a value that is invalid (i.e., not present), then an output from one of the set of second selectors S2 is written/supplied to the corresponding one of the accumulator registers 502 (e.g., 1st Row Acc Reg, 2nd Row Acc Reg, . . . , Mth Row Acc Reg). FIG. 6A and FIG. 6B are block diagrams of the example data path controller 112 of FIG. 1 configured to perform row—major data access/column major data access, respectively. Referring first to FIG. 6A, in some examples, the data path controller 112 (see FIG. 1) configured to perform Row Request data accesses includes the example ALU/data buffer 122 including the example address based tag look up memory (ALU) 122A, and an example line buffer 122B. The example data path controller 112 of FIG. 6A further includes the example memory requester 120, the example response handler 124, and an example hold logic 602 (also known as a data qualifier). In some examples, the matrix computations performed by the compute engine 108 require transpose versions of the matrices being multiplied (e.g., the A Matrix and the B Matrix). When dealing with large matrices, explicit computations add extra compute latencies, and additional memory accesses and use additional bandwidth. The example data path controller 112 of FIG. 6A and FIG. 6B includes a unified micro-architecture design to provide for data-path logic that fetches matrices in both a row-major format and a column-major (e.g., transposed) format. The ALU 122A operates like a hardware search engine for address based tag lookup. The ALU 122A is able to search all entries (i.e., rows) of the example line buffers 122B in a single clock cycle. If the line buffers 122B do not hold the searched—for entries, the ALU 122A provides the memory address to the memory requester 120 which uses the address to identify the location of the desired data in the example memory 106. The desired data is then retrieved from the memory 106 by the example response handler 124 and stored in the example line buffer 122B.

In some examples, the example ALU 122A performs row-major accesses by searching the example line buffers 122B. If the ALU 122A identifies the searched-for entries in the line buffers 122B, the data stored in the line buffers is supplied to the hold logic 602 which holds the data until a hit signal is received from the ALU 122A. When such a hit signal is received the held data is supplied as row data to the example compute engine 108.

Referring now to FIG. 6B, in some examples, the example data path controller 112 (see FIG. 1) configured to perform Column Request data accesses includes the example ALU 122A, the example line buffer 122B, the example memory requester 120, the example response handler 124, the example hold logic 602, and the example column selector 604. For column-major accesses, the data path controller 112 causes the ALU 122A to search the line buffers 122B for the requested data, by dividing each address request into multiple ALU data searches, each ALU data search corresponds to one memory line of the line buffers 122B that spans multiple column elements, and each of the ALU data searches is performed individually. In addition, the data is fetched from memory on the miss-path when the ALU 122A is unable to locate the searched-for data in the line buffers 122B. Once a hit signal is received by the hold logic 602 (e.g., once all of the memory accesses have been successful) data held in the hold logic 602 (e.g., the column data from the example line buffers 122B) is sent to the compute engine 108. Thus, if column accesses are made back-to-back, the design avoids re-fetches and supplies data instantly to the compute engine 108 instead of having to perform a re-fetch as is required in conventional data path controller designs. The example held logic 602 of FIGS. 6A and 6B is located in the address look up/data buffer 122 of FIG. 1 or in any of the other blocks of the data path controller 112. The example selector 604 of FIG. 6B can be located in the address look up/data buffer 122 of FIG. 1 or in any of the other blocks of the data path controller 112 of FIG. 1.

FIG. 7A illustrates an example triangular storage 702A having the upper triangle of the storage 702A containing valid data and the lower portion of the storage 702A does not containing valid data. In some examples, the valid data may instead be stored in the lower portion of the triangular storage 702A such that upper portion of the storage 702A does not contain valid data. In some examples, the triangular storage 702A includes an example first row storing a first block of data 704A, an example second row storing a second block of data 704B, an example third row storing a third block of data 704C, an example fourth row storing a fourth block of data 704D, an example fifth row storing a fifth block of data 704E, and an example sixth row storing an example sixth block of data 704F. As only the upper or lower portion contains valid data, there is no need to write data or read data from the upper or lower triangle that is empty of data. The reduction of write and read operations significantly reduces the number of memory accesses and memory storages that are performed and thereby results in enhanced design power efficiency. In a naïve approach with back-to-back storage, for an "n×n" dimensional triangular matrix 702A (where n represents a data element), "n(n−1)/1" fewer data element storage spaces contain data.

FIG. 7B illustrates an example rectangular storage 702B in which the blocks of data illustrated in FIG. 7A are stored in rows of the triangular storage and some of the rows of the rectangular storage 702B contain data of more than one block of data. In some examples, the rectangular storage 702B includes an example first row 706A storing the example first block of data, an example second row 706B storing the example second block data and a first portion of the example third block of data, an example third row 706C storing a second portion of the third block of data and storing the fourth block of data, an example fourth row 706D storing the example fifth and sixth blocks of data, and additional empty rows 706E and 706F of memory. The fully (and one partially) empty rows 706E-G of memory are unoccupied by the blocks of valid data thereby freeing up the space for other data or providing the ability to use a smaller memory storage.

FIG. 7C is a block diagram of an example read translation circuit 708 for generating a linear address based on whether an example upper or lower triangular portion of the example triangular storage 702A of FIG. 7A is filled with data. In some examples, the read translation circuit 708 includes the example address translator 118 (see also FIG. 1), an example selector 710, and an example in-line buffer 712. In some examples, the address translator 118 has an example input on which information identifying a row and column at which a data element can be found is supplied to the address translator 118. The address translator translates the row, column information into a linear address based on a matrix storage type (e.g., upper triangular storage or lower triangular storage). If the linear address corresponds to the portion (upper or lower) in which data is stored, then a valid selection signal is supplied to the selector 710 and the computed linear address is supplied via the first translator output to the memory for performing a read access. Data stored at the computed linear address is then supplied to the input of the in-line buffer 712 for output to any circuit device that requested a read access. If the computed linear address corresponds to the portion (upper or lower) of the triangular storage in which no data is stored, then an invalid signal is supplied by the to the selector 710 and the selector 710 causes the second output of the selector 710 to supply a zero to the in line buffer 712 for delivery to the circuit device that requested the read access. Thus, any read access to a portion (upper/lower) of the triangular storage having no data stored therein is bypassed by automatically filling the in line buffer 712 with a zero thereby preventing an unnecessary read access.

FIG. 7D is a block diagram of an example write translation circuit 714 for generating a linear address based on whether an example upper or lower triangular portion of the example triangular storage 702 of FIG. 7A is filled with data. In some examples, the write translation circuit 714 includes the address translator 118 (see also FIG. 1), and two example AND gates (e.g., a first AND gate 716 and a second AND gate 718). In some examples, the address translator 118 has an example input on which information identifying the location of a data element stored in a matrix is provided in a row number, column format. The address translator 118 translates the row, column information into a linear address based on a matrix storage type (e.g., upper triangular storage or lower triangular storage). If the linear address corresponds to the portion (upper or lower) of the storage 702A in which data is stored, the linear address is supplied from the address translator 118 to a first input of the first AND gate 716 and a "valid" signal is supplied to a second input of the first AND gate 716 and to a first input of the second AND gate 718. Supplying these output signals to the first and second AND gates 716, 718 in this manner causes the linear address to be supplied by the first AND gate 716 to the memory address to which the data element is to be written and further causes the second AND gate 718 to permit the flow of data (e.g., the data element) from the second AND gate 718 to the memory so that the data element is written to the memory address supplied to the memory via the first AND gate 716. If the linear address does not correspond to the portion (upper or lower) of the storage 702A in which data is stored, then the write request is "dropped" by sending an "invalid" signal to the first and second AND gates 716, 718 thereby preventing the write request from being performed. In some examples, the operations performed by the read and write translators of FIGS. 7C and 7D can be performed using the rectangular storage 702B. In some such examples, the same operations are performed except that the read and write translators 708, 714 are configured to determine whether an address of the rectangular storage 702B contains valid or invalid data and operate accordingly. In some examples, the blocks and circuitry of FIGS. 7C and 7D are included in the address/generator/translator 118 of FIG. 1. The example read translation circuit 708 of FIG. 7C and the example write translation circuit 710 of FIG. 7D prevent read accesses and write operations on a portion (upper or lower) of a triangular storage 702A that does not contain data. The proposed storage layout and the method of bypassing reads from the storage portion that does not contain valid data and dropping write operations of data from the storage portion that does not contain valid data provides data-alignment that achieves near theoretical compression.

Figures 7E, 7F:
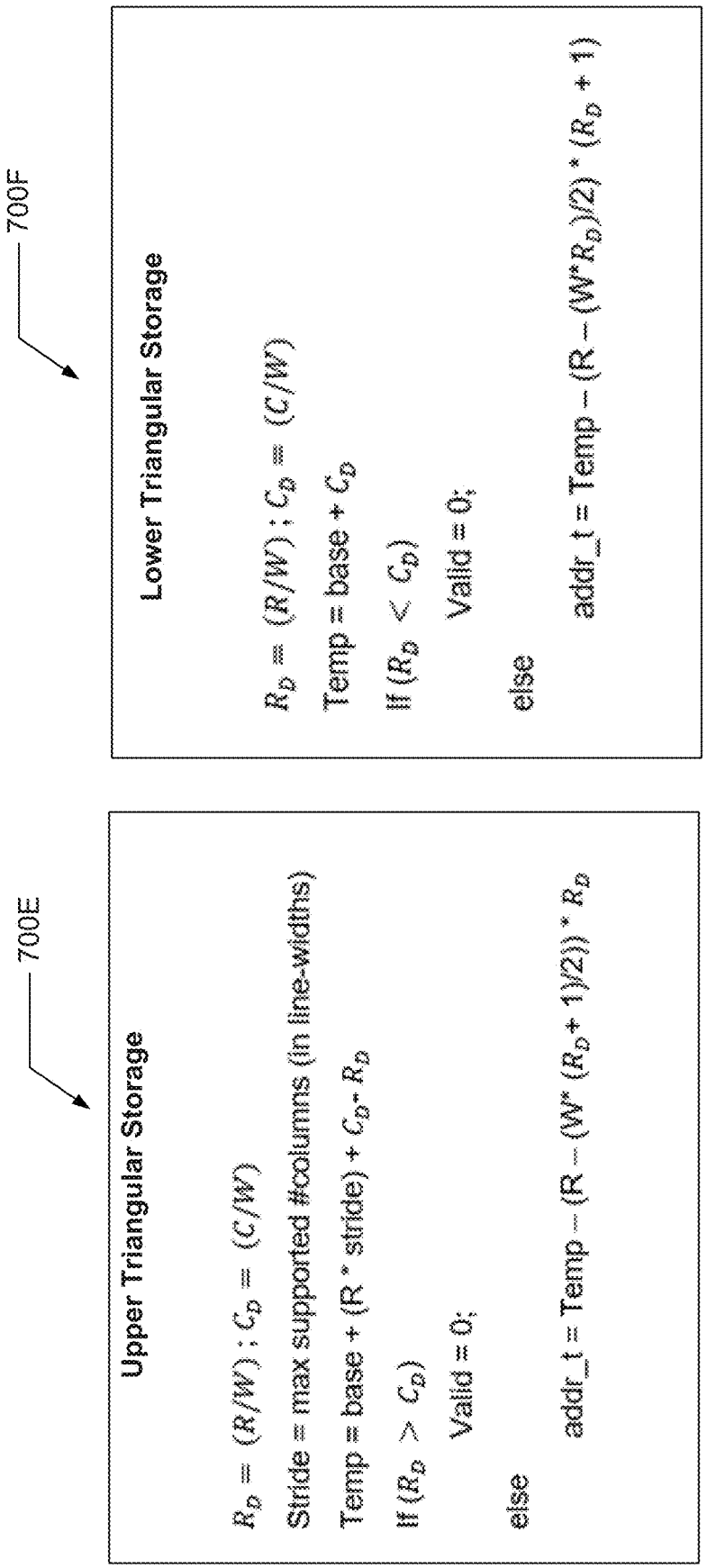
FIG. 7E illustrates example pseudocode for translating row and column information identifying the location of a data element in a matrix into a linear computer address when the data to be translated is stored in an upper portion of the memory of FIG. 7A.
FIG. 7F illustrates example pseudocode for translating row and column information identifying the location of a data element in a matrix into a linear computer address when the data to be translated is stored in a lower portion of the memory of FIG. 7A.

Turning now to FIG. 7E, FIG. 7E illustrates example pseudo-code 700E for a method performed by the address translator 118 (see FIG. 1 and FIGS. 7A and 7B) to translate row index, column index information identifying a location of a data element in a matrix into a linear address when the upper triangle of the storage 702A (see FIG. 7A) is used to store valid data. FIG. 7F illustrates example pseudo-code 700F for a method to translate row, column index information identifying a location of a data element in a matrix into a linear address when the lower triangle of the storage 702A (see FIG. 7A) is used to store valid data. In FIGS. 7E and 7F, the letter R represents "row," the letter C represents "column," and the letter W represents the "line-width" (e.g., the number of elements obtained in a single memory access.) Further the value of the variable "Temp" is obtained as specified in FIG. 7F and the "stride" represents the supported number of columns (measured in line widths).

Figure 8:
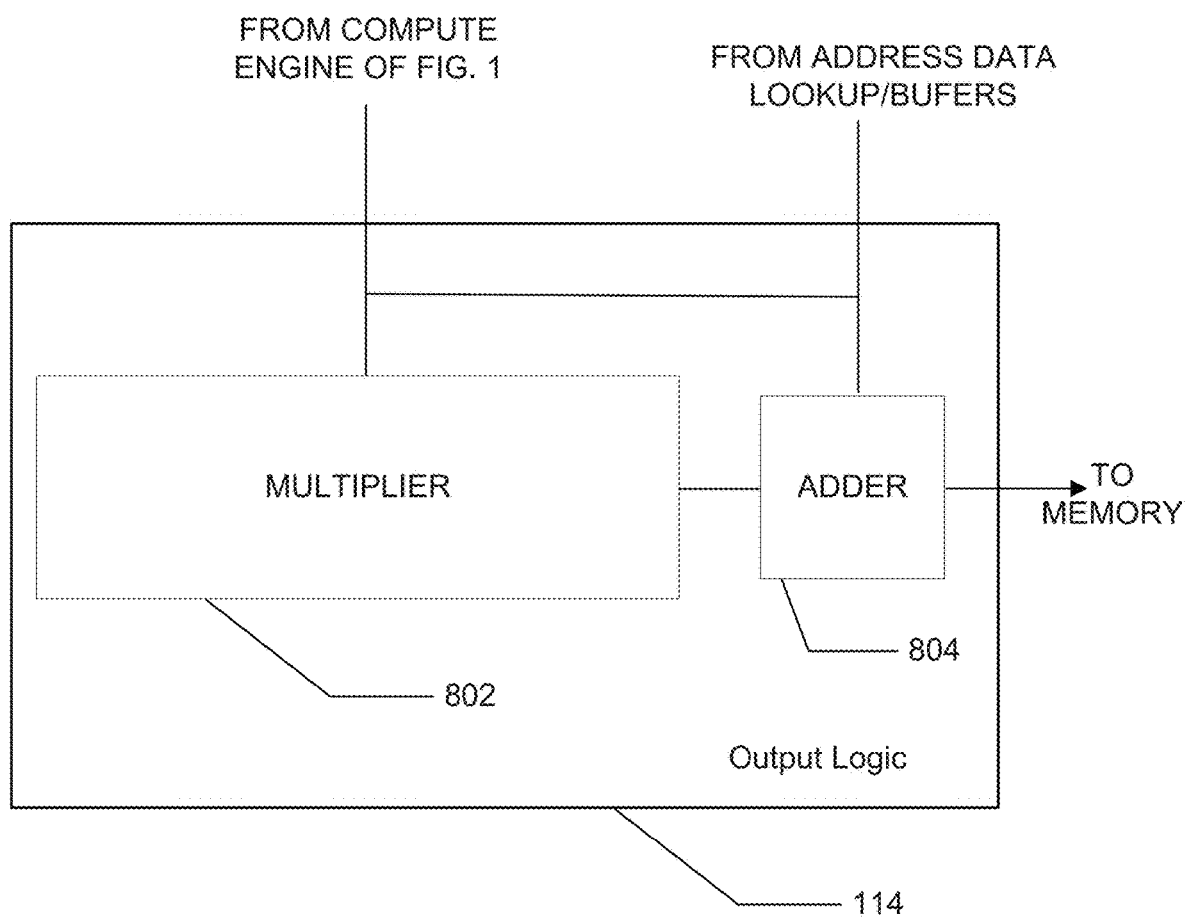
FIG. 8 is a block diagram of the example output logic of the matrix multiply system of FIG. 1.

FIG. 8 is a block diagram of the example output logic of the matrix multiply system of FIG. 1. In some examples, the output logic 114 includes an example multiplier 802 and an example adder 804. The multiplier 802 receives input from the compute engine 108. In some examples, the multiplier 802 receives all of the input matrices required to perform the multiplication operations of Coutput=α·(A×B)+β·Cinput from either or both of the compute engine 108 and/or the address data lookup/buffers 122. As described above, the A, B, Cinput and Coutput variables each represent a matrix. The α and β variables (which can be supplied by the example configurer 116 via the compute engine 108 or via the address data lookup/buffers 122) represents a scalar (see FIG. 1). In some examples, the multiplication of the A matrix and the B matrix by the α variable operates to scale the (A×B)," and the β variable multiplied by the Cinput portion of the equation operates as an offset. The multiplier 802 multiplies the A matrix by the B matrix and by the α variable and further multiplies the Cinput matrix by the β variable. The products of both multiplication operations are supplied to the adder 804 which proceeds to perform the addition operation represented in the equation Coutput=α·(A×B)+β·Cin. Thus, the Coutput matrix is generated and supplied by the adder 804 to the memory 106 of FIG. 1.

While an example manner of implementing the matrix multiply system 100 is illustrated in FIGS. 1, 2, 3A-3C, 4, 5, 6A,6B, 7A-7F, and 8, one or more of the elements, processes and/or devices illustrated in FIGS. 1, 2, 3A-3C, 4, 5, 6A,6B, 7A-7F, and 8 may be combined, divided, re-arranged, omitted, eliminated and/or implemented in any other way. Further, the example matrix multiply engine 102, the example host/micro-controller 104, the example memory 106, the example compute engine 108, the example sequencer 110, the example memory requester 120, the example output logic 114, the example configurer 116, the example address generator 118, the example ALU/data buffer 122 the example response handler 124, and/or, more generally, the example matrix multiply system 100 of FIGS. 1, 2, 5, 6A, 6B, 6C, 7A-7F, and FIG. 8 may be implemented by hardware, software, firmware and/or any combination of hardware, software and/or firmware. Thus, for example, any of the example matrix multiply engine 102, the example host/micro-controller 104, the example memory 106, the example compute engine 108, the example sequencer 110, the example memory requester 120, the example output logic 114, the example configurer 116, the example address generator 118, the example ALU/data buffer 122 the example response handler 124, and/or, more generally, the example matrix multiply system 100 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), field programmable gate arrays (FPGAs) and/or field programmable logic device(s) (FPLD(s)). When reading any of the apparatus or system claims of this patent to cover a purely software and/or firmware implementation, at least one of the example matrix multiply engine 102, the example host/micro-controller 104, the example memory 106, the example compute engine 108, the example sequencer 110, the example memory requester 120, the example output logic 114, the example configurer 116, the example address generator 118, the example ALU/data buffer 122, and/or the example response handler 124 is/are hereby expressly defined to include a non-transitory computer readable storage device or storage disk such as a memory, a digital versatile disk (DVD), a compact disk (CD), a Blu-ray disk, etc. including the software and/or firmware. Further still, the example matrix multiply system 100 may include one or more elements, processes and/or devices in addition to, or instead of, those illustrated in FIGS. 1, 2, 3A-3C, 4, 5, 6A,6B, 7A-7F, and 8, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the example matrix multiply system 100 are shown in FIGS. 9-17. In these examples, the machine readable instructions may be one or more executable programs or portion(s) of an executable program for execution by a computer processor, such as the processor 1812 shown in the example processor platform 1800 discussed below in connection with FIG. 18. The one or more programs, or portion(s) thereof, may be embodied in software stored on a non-transitory computer readable storage medium such as a CD-ROM, a floppy disk, a hard drive, a DVD, a Blu-ray Disk™, or a memory associated with the processor 1712, but the entire program or programs and/or parts thereof could alternatively be executed by a device other than the processor 1812 and/or embodied in firmware or dedicated hardware. Further, although the example program(s) is(are) described with reference to the flowcharts illustrated in FIGS. 9-17, many other methods of implementing the example matrix multiply system 100 of FIG. 1 may alternatively be used. For example, with reference to the flowcharts illustrated in FIGS. 9-17, the order of execution of the blocks may be changed, and/or some of the blocks described may be changed, eliminated, combined and/or subdivided into multiple blocks. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 9-16 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. Also, as used herein, the terms "computer readable" and "machine readable" are considered equivalent unless indicated otherwise.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 9:
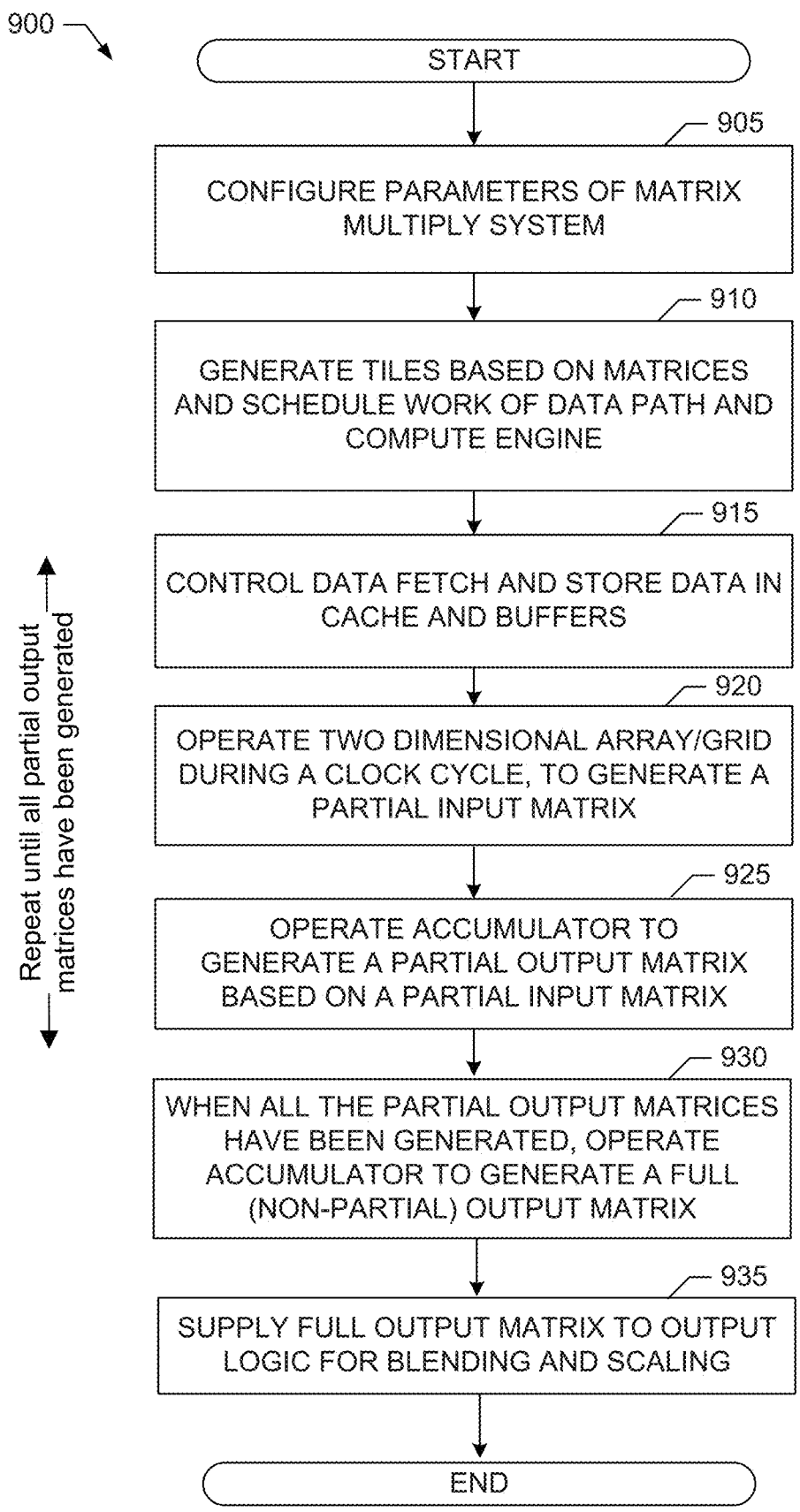
FIG. 9 is a flowchart representative of example computer readable instructions that may be executed to implement the example matrix multiply system of FIG. 1.

An example program 900 that may be executed to implement the example matrix multiply system 100 of FIGS. 1, 2, 3A-3C, 4, 5, 6A, 6B, 7A-7F, and 8 is represented by the flowchart shown in FIG. 9. The example program 900 may be executed at predetermined intervals, based on an occurrence of a predetermined event, etc., or any combination thereof. With reference to the preceding figures and associated written descriptions, the example program 900 of FIG. 9 begins execution at block 905 at which the example configurer 116 sets one or more parameters to be used by at least the example compute engine 108 and the example output logic 114 of FIG. 1 as described above in connection with FIG. 1 and FIG. 4. In some examples, the parameters are selected or determined by a user and supplied to the configure 116 via any type of input interface (e.g., the input interface 116A). At block 910, the example sequencer 110 of FIG. 1 divides matrices (e.g., the A Matrix (see FIG. 3A) and the B Matrix (see FIG. 3B)) into tiles and further schedules work to be performed by the example data path controller 112 of FIG. 1 and the example compute engine 108 of FIG. 1 and FIG. 2 as described above with reference to FIGS. 1, 2, and 5. In addition, the scheduler 110 determines an order in which the data path controller 112 and the compute engine 108 are to operate relative to one another. At block 915, the example data path controller 112 fetches and places tile data (e.g., A Tiles 206A, B Tiles 208B) into the example cache 206 and the example buffers 208, respectively, for access by the example compute engine 108 as described above in connection with FIGS. 6A, 6B, 7A-7F, and/or 8. At block 920, the example two dimensional array/grid 212 of the compute engine 108 operates for a clock cycle, to generate a partial input matrix to be supplied to the example multi-channel n-stage accumulator 210 (also of the compute engine 108) as described above in connection with FIG. 2. At block 925, the multi-channel n-stage accumulator 210 operates on the supplied partial input matrix to generate a partial output matrix. The blocks 915-925 are repeated as many cycles as needed (e.g., M) to generate all partial input matrices. Once all partial output matrices have been generated, the full (non-partial) output C matrix (see FIG. 6C) is generated by the accumulator 210 at block 930. At block 935, the full output C matrix is scaled and blended by the output logic 114, as described in connection with FIG. 1 and FIG. 8. After block 935, the program ends or is repeated as needed to generate another scaled and blended output matrix.

Figure 10:
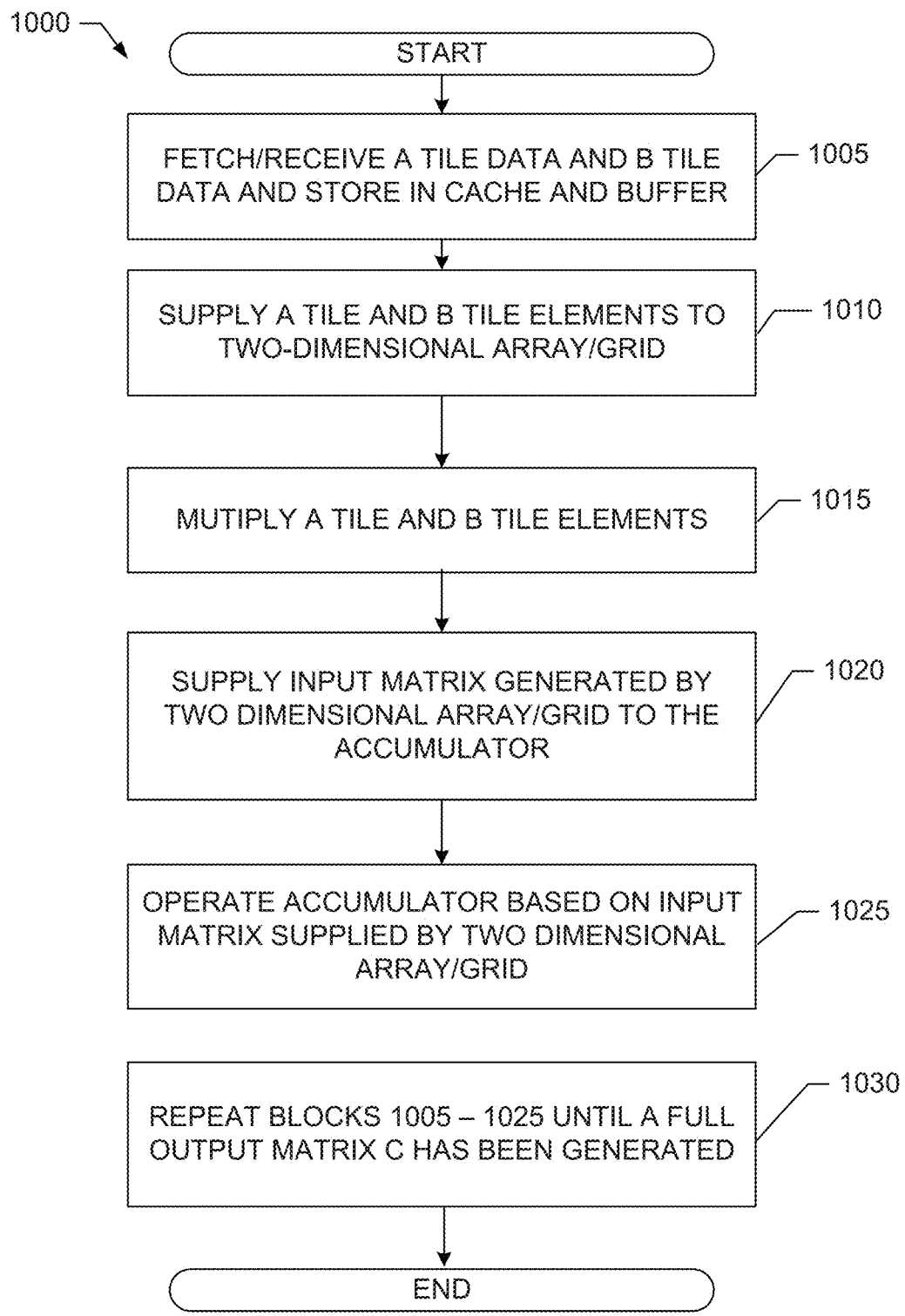
FIG. 10 is a flowchart representative of example computer readable instructions that may be executed to implement the example compute engine of FIG. 1 and/or FIG. 2.

An example program 1000 that may be executed to implement the example compute engine 108 of FIGS. 1, 2 and 5 is represented by the flowchart shown in FIG. 10. The example program 1000 may be executed at predetermined intervals, based on an occurrence of a predetermined event, etc., or any combination thereof. With reference to the preceding figures and associated written descriptions, the example program 1000 of FIG. 10 begins at block 1005. At block 1005, the example cache 206 (see FIG. 2) and data buffers 208 are supplied with A Tile data 206A and B Tile data 208B as described in connection with FIGS. 1, 2, 5, 6A, 6B and/or 7A, 7B, 7C, 7D, 7E, 7F. At block 1010, the A Tile data 206A and the B Tile data 208B is supplied to the example two dimensional array/grid 212 of multipliers and the columns of adders/adder trees. At block 1015, the two dimensional array/grid 212 of multipliers 202 and adders 204 multiplies and adds the data elements of the A Tile 206A and the B Tile 208B as described in connection with FIG. 2 to generate a Cinput matrix containing a single row of P elements of data. At block 1020, the two dimensional array/grid 212 supplies the example partial Cinput matrix to the example multi-channel n-stage accumulator 210 as described in connection with FIG. 2 and FIG. 5. At block 1025, the accumulator 210 operates on the input matrix supplied by the two dimensional array/grid 212. At block 1030, blocks 1005-1025 are repeated until a full output matrix C has been generated by the compute engine. After the block 1030, the program 1000 ends.

Figure 11:
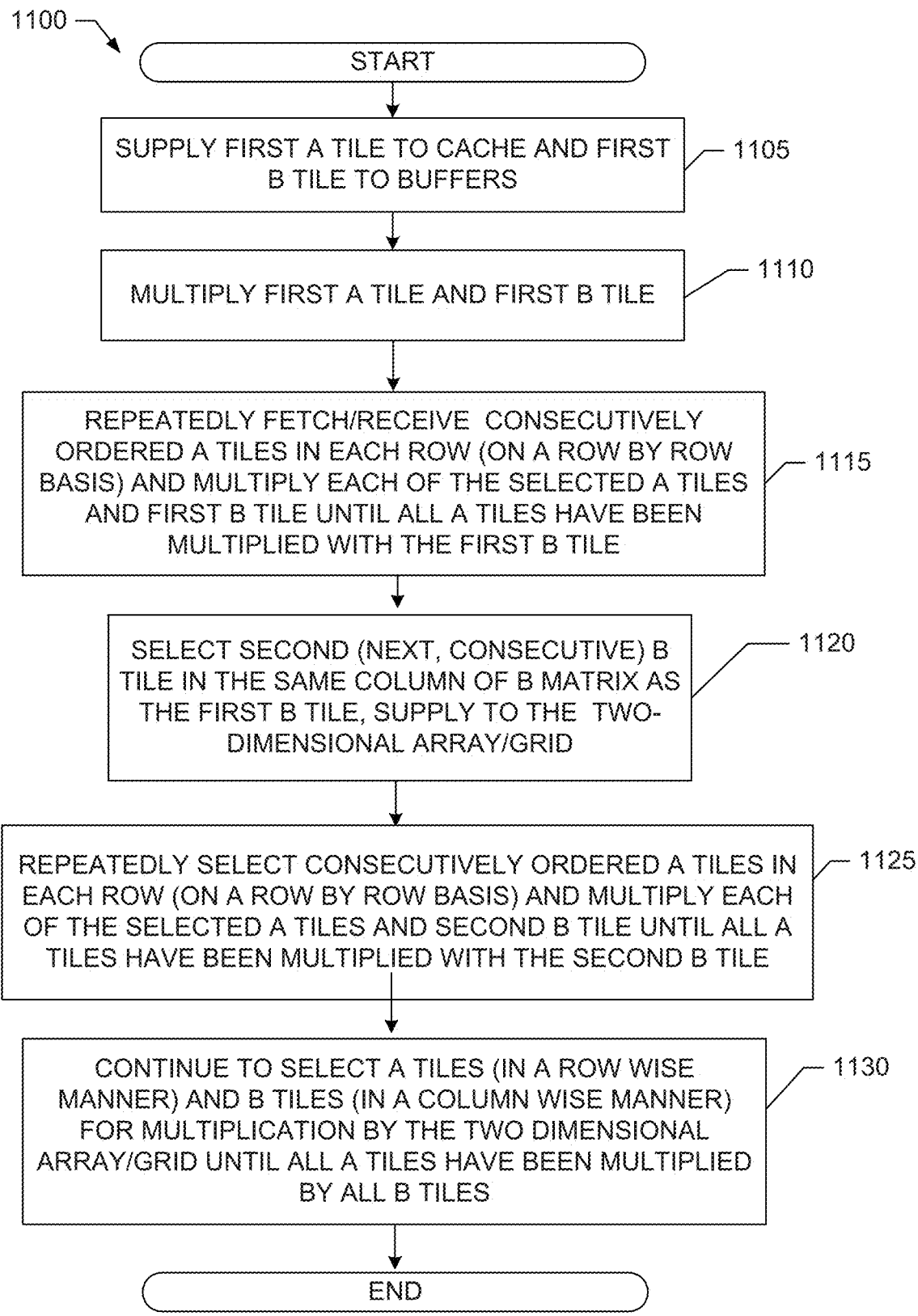
FIG. 11 is a flowchart representative of example computer readable instructions that may be executed to select A Tiles and B Tiles for multiplication by the compute engine of FIG. 1 and/or FIG. 2.

An example program 1100 that may be executed to implement the example compute engine 108 and the operation of the data path controller 112 of FIGS. 1, 2, 6A and 6B is represented by the flowchart shown in FIG. 11. The example program 1100 may be executed at predetermined intervals, based on an occurrence of a predetermined event, etc., or any combination thereof. With reference to the preceding figures and associated written descriptions, the example program 1100 of FIG. 11 of begins at block 1105. At block 1105, a first A Tile 206A is supplied by the example data path controller 112 to the example cache 206 (see FIG. 2) and a first B Tile 208B is supplied by the example data path controller 112 to the example buffers 208 (see FIG. 2). At block 1110 the first A Tile is multiplied with second B Tile by the two-dimensional array/grid 212 (see FIG. 2). At block 1115, the data path controller 112 repeatedly supplies consecutively ordered A tiles in each row (on a row by row basis) and the two-dimensional array/grid 212 multiplies each of the A Tiles with the first B tile until all A tiles have been multiplied with the first B Tile. At block 1120, a second (next), consecutive B tile stored in the same column of the B Matrix as the first B tile is supplied to the buffers 208 (see FIG. 2). At block 1125, the A tiles 206A are repeatedly supplied on a row by row basis to the cache 206 and multiplied by the second B tile until all A Tiles 206A have been multiplied by the second B tile 208B. At block 1130, the data path controller 112 continues to select A tiles 206A on a row-by row basis and to select B tiles 208B on a column-by-column basis until, as described in connection with blocks 1115 and 1120, all of the A tiles 206A have been multiplied by all of the B tiles 208B and the program 1100 ends.

Figure 12:
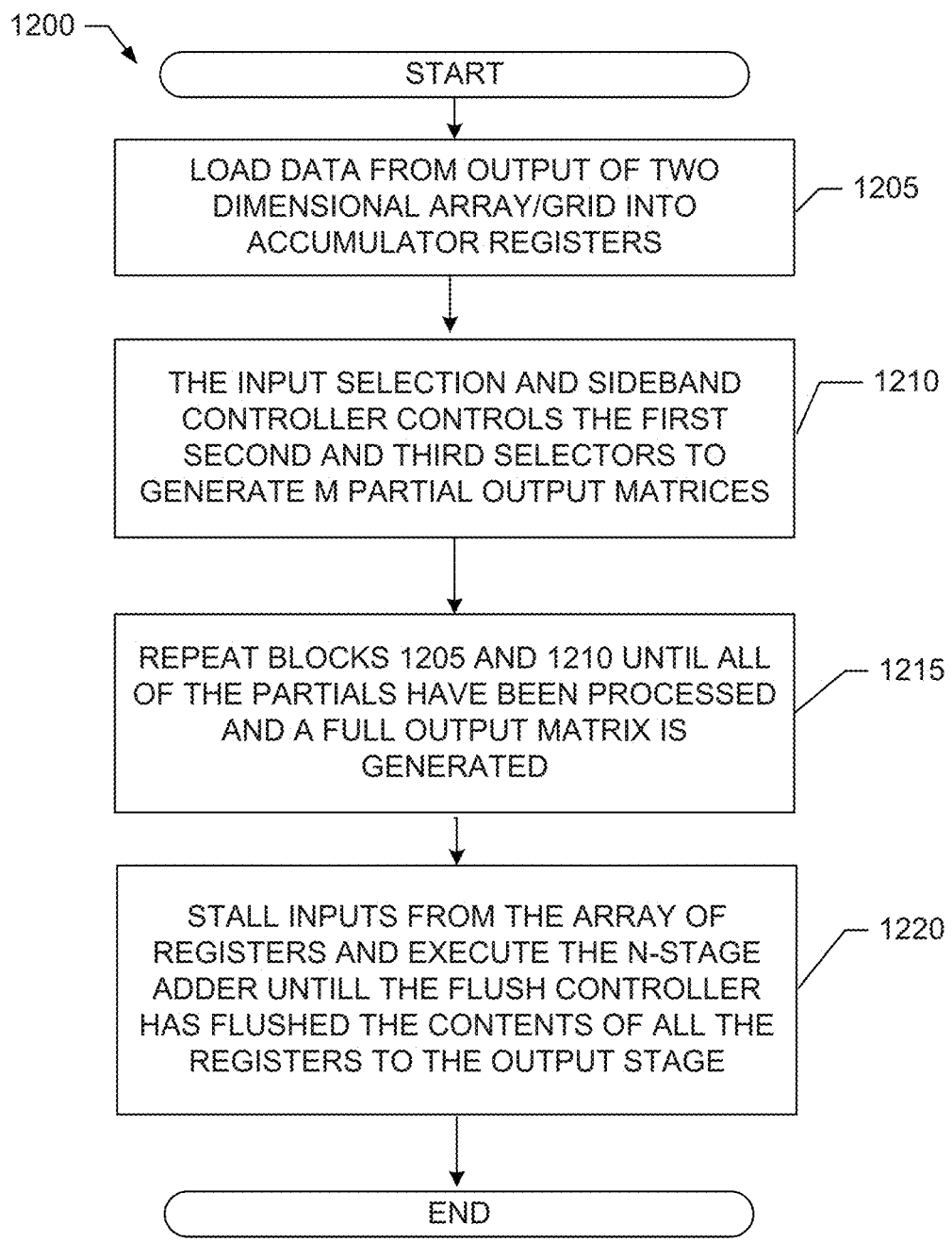
FIG. 12 is a flowchart representative of example computer readable instructions that may be executed to implement an example channel of the example multi-channel n-stage accumulator of FIG. 5.

An example program 1200 that may be executed to implement the example multi-channel n-stage accumulator 210 of FIGS. 2 and 5 are represented by the flowchart shown in FIG. 12. The example program 1200 may be executed at predetermined intervals, based on an occurrence of a predetermined event, etc., or any combination thereof. With reference to the preceding figures and associated written descriptions, the example program 1200 of FIG. 12 of begins at block 1205. At block 1205, data from the output (e.g., the Cinput matrix) of the two dimensional array 212 is loaded into the multi-channel n-stage accumulator 210. In some examples, the multi-channel n-stage accumulator 210 includes P channels. In some examples, the input matrix data is loaded into example accumulator registers (e.g., 1st Row Acc Reg, 2nd Row Acc Reg, . . . , Mth Row Acc Reg) arranged in an example array format 502. In some examples, the array 502 is designed such that each row of the array 502 includes a different one of the accumulator registers (e.g., 1st Row Acc Reg, 2nd Row Acc Reg, . . . , Mth Row Acc Reg). The array 502 can include a same number of rows as clock cycles (e.g., M). The array 502 is further configured such that the accumulator registers 502 (e.g., 1st Row Acc Reg, 2nd Row Acc Reg, . . . , Mth Row Acc Reg) form a single column and the data stored in the accumulator registers (e.g., 1st Row Acc Reg, 2nd Row Acc Reg, ..., Mth Row Acc Reg) of a same one of the n-stages of the accumulator 210 contains data included in a single column of multiple ones of the Cinput matrices generated by the two dimensional array/grid 212. As a result, each one of the example accumulator registers (e.g., 1st Row Acc Reg, 2nd Row Acc Reg, ..., Mth Row Acc Reg) contains an "A×B" row element (e.g., partial "A×B" data from a different row) of the Cinput Matrix.

At block 1210, the example input selection and sideband controller 508 (see FIG. 5) operates to control the first, second and third selectors 510 as described in connection with FIG. 5. In particular, the array of registers 502 store operands temporarily until another operand is available from either the input stage 504, or the output stage 518, and the input selection and side band control 508 considers the input stage 504, the output stage 518 or the temporarily stored operands in the array of registers 502 (the ACC Regs) when selecting two operands to be added together by the N stage adder 512. At block 1215, the operations described in connection with blocks 1205 and 1210 are repeated until all the partial matrices have been processed and a full output matrix (e.g., output matrix C) has been generated. At block 1220 and as described in connection with FIG. 5, inputs from the input stage 504 are stalled and the n-stage adder 512 executes until the flush controller 506 has caused all registers of the register array 502 to be collected for accumulation and a final partial result is flushed to the output stage 518 to pair with data at the input stage 504 for a final addition operation. After block 1220, the program ends.

Figure 13:
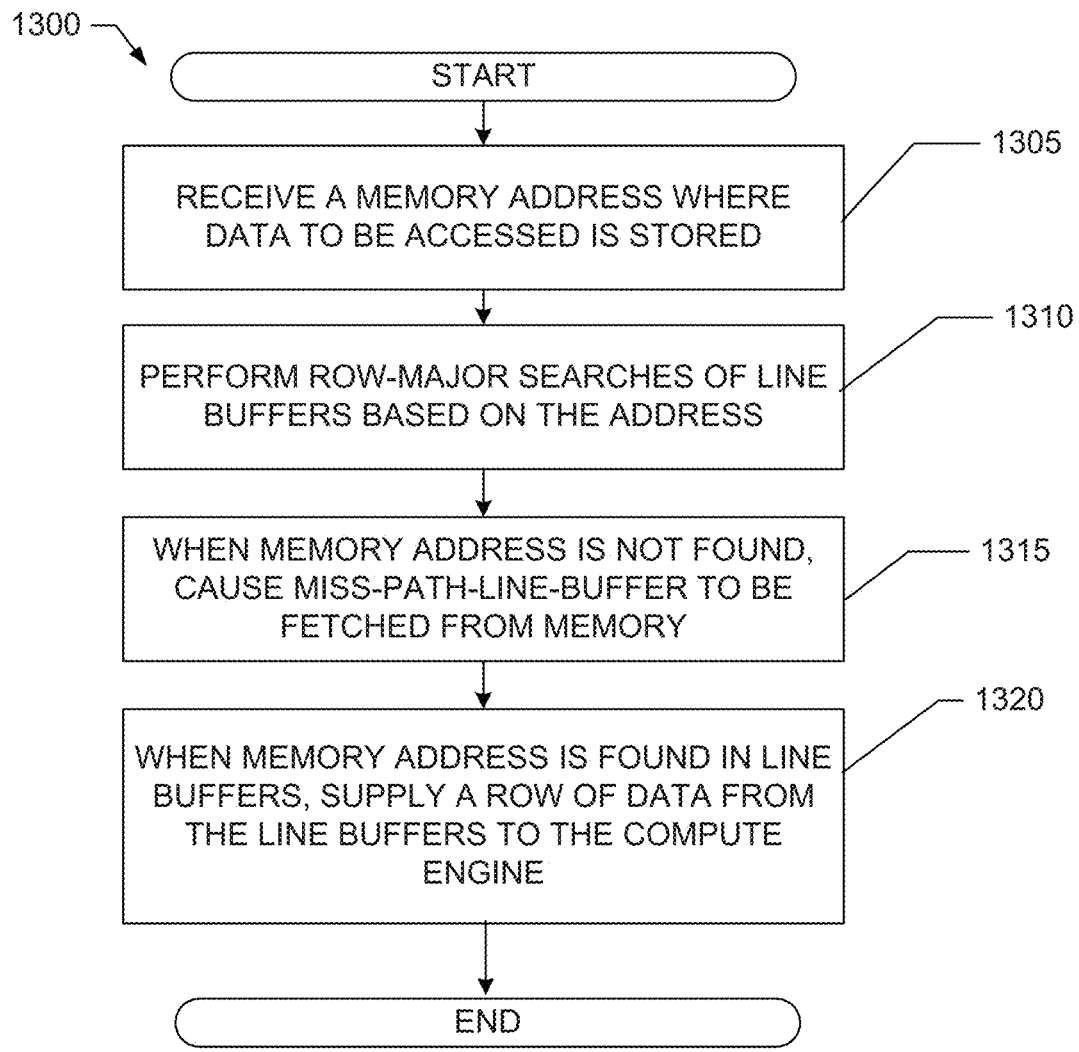
FIG. 13 is a flowchart representative of example computer readable instructions that may be executed to implement the example data path controller of FIG. 1 to perform row-major memory searches.

An example program 1300 that may be executed to implement the example data path controller 110 configured to perform row-based data access of FIGS. 1 and 7C are represented by the flowchart shown in FIG. 13. The example program 1300 may be executed at predetermined intervals, based on an occurrence of a predetermined event, etc., or any combination thereof. With reference to the preceding figures and associated written descriptions, the example program 1300 of FIG. 13 of begins at block 1305. At block 1305, the example ALU 122A of the data path controller 112 receives a memory address at which the data (input operands) is stored as described in connection with FIG. 7C. At block 1310, the example ALU 122A performs row-major accesses by searching the example line buffers 122B using the address. At block 1315, when the memory address cannot be located in the line buffers 122B (e.g., a miss is detected), the ALU 122A causes the miss-path-line-buffer data to be fetched from the example memory 106 as described in connection with FIG. 7C. At block 1320, when the memory address is located in the line buffers 122B (e.g., a hit is detected) a row of data from the line buffers 1226 is supplied to the hold logic 602 and subsequently released to the compute engine 108 in the manner described with reference to FIG. 7C. The program 1300 then comes to end (or is repeated as necessary to continue fetching data for the compute engine 108).

Figure 14:
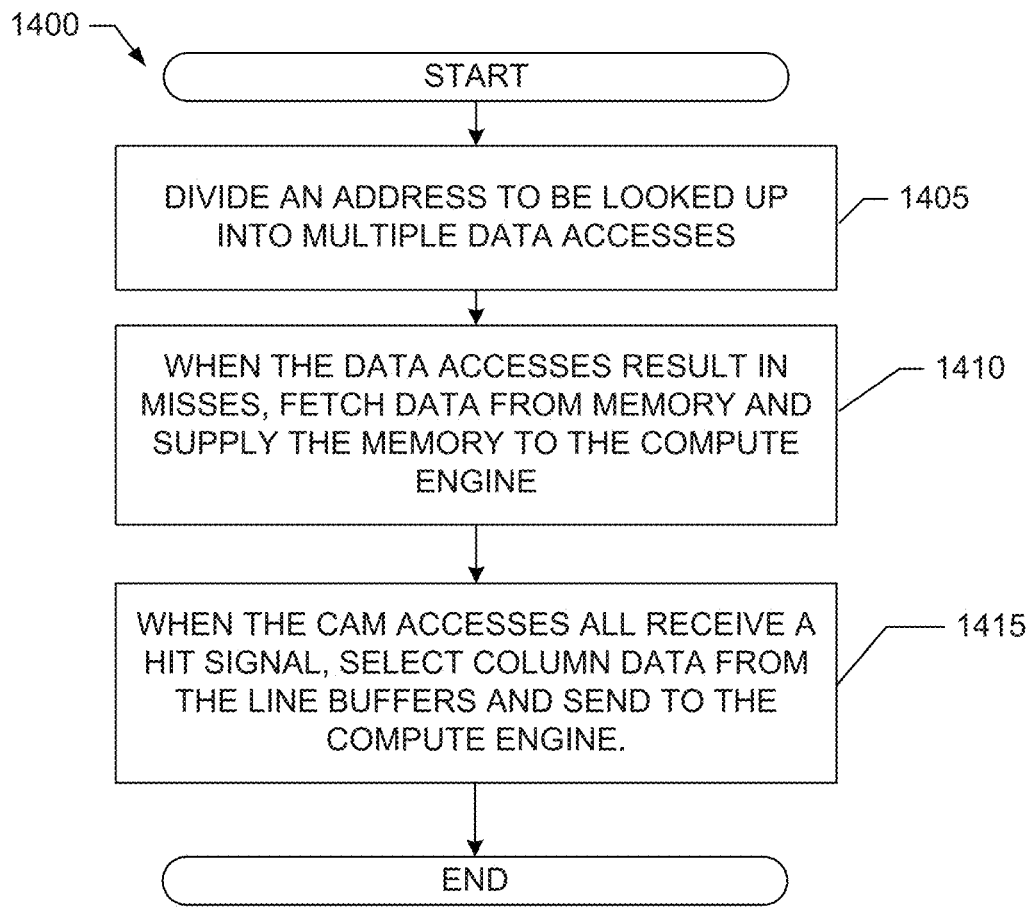
FIG. 14 is a flowchart representative of example computer readable instructions that may be executed to implement the example data path controller of FIG. 1 to perform column-major memory searches.

An example program 1400 that may be executed to implement the example data path controller 112 (of FIGS. 1 and 7D) configured to perform a column-based data access is represented by the flowchart shown in FIG. 14. The example program 1400 may be executed at predetermined intervals, based on an occurrence of a predetermined event, etc., or any combination thereof. With reference to the preceding figures and associated written descriptions, the example program 1400 of FIG. 14 of begins at block 1405. At block 1405, the ALU 122A divides an address into multiple data searches to be performed on the line buffers 1226. Each division of the address corresponds to one memory line that spans multiple column elements, and each of the divisions of the address are searched by the ALU 122A in the line buffers 1226. At block 1410, the memory address is not located in the line buffers 122B (e.g., a data miss occurs), and the data is instead fetched from the example memory 106 (see FIG. 1) and supplied to the compute engine 108 in the manner described above with reference to FIG. 7D. At block 1415, if all the memory accesses are located in the line buffers 122B, then a set of hit signals are received based on all of the memory accesses, and the column data selected from the example line buffers 122B and sent to the compute engine 108 as described above in connection with FIG. 7D. After the block 1415, the program ends.

Figure 15:
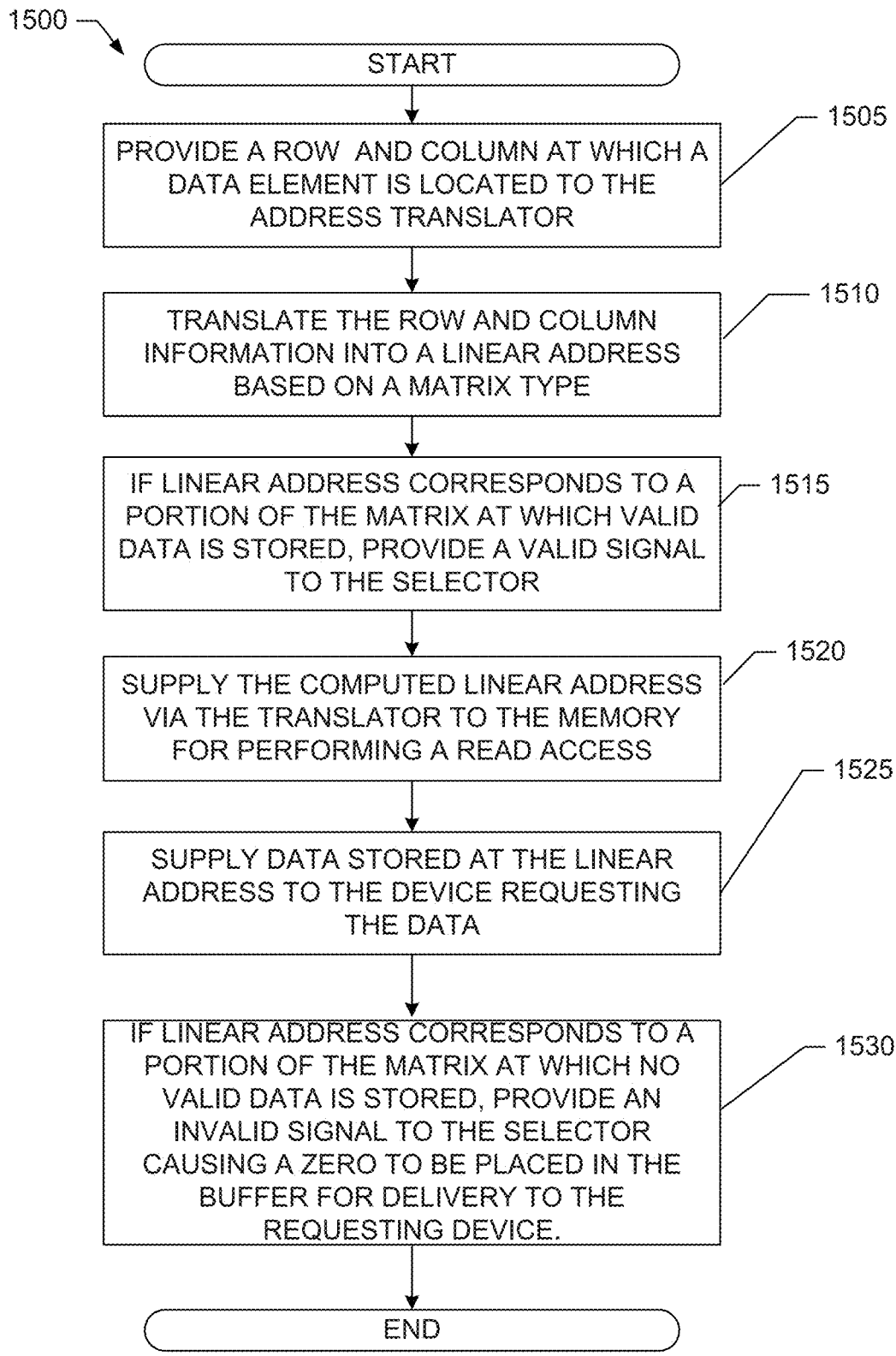
FIG. 15 is a flowchart representative of example computer readable instructions that may be executed to implement the example data path controller of FIG. 1 to perform a read access of memory based on row and column information

An example program 1500 that may be executed to implement the example address translator 118 of the example data path controller 112 (of FIGS. 1 and 7C) configured to perform a read translation is represented by the flowchart shown in FIG. 15. The example program 1500 may be executed at predetermined intervals, based on an occurrence of a predetermined event, etc., or any combination thereof. With reference to the preceding figures and associated written descriptions, the example program 1500 of FIG. 15 of begins at block 1505. At block 1505, information identifying a row and column at which a data element can be found is supplied to the address translator 118. At block 1510, the address translator 118 translates the row, column information into a linear address based on a matrix type (e.g., upper triangular storage or lower triangular storage). If the linear address corresponds to the portion (upper or lower) in which data is stored, then at block 1515, a valid selection signal is supplied to the selector 710. At block 1520 the computed linear address is supplied via the address translator 118 to the memory 106 for performing the read access. At block 1525 data stored at the computed linear address is supplied to the in-line buffer 712 for output to any circuit device that requested a read access. If the computed linear address corresponds to the portion (upper or lower) of the triangular storage 702A in which no valid data is stored, at block 1530, an invalid signal is supplied to the selector 710 causing a zero to be placed in the in line buffer 712 for delivery to the circuit device that requested the read access. Thus, any read access to a portion (upper/lower) of the triangular storage having no data stored therein is bypassed by automatically filling the in-line buffer 712 with a zero thereby preventing an unnecessary read access. After the block 1530, the program ends.

Figure 16:
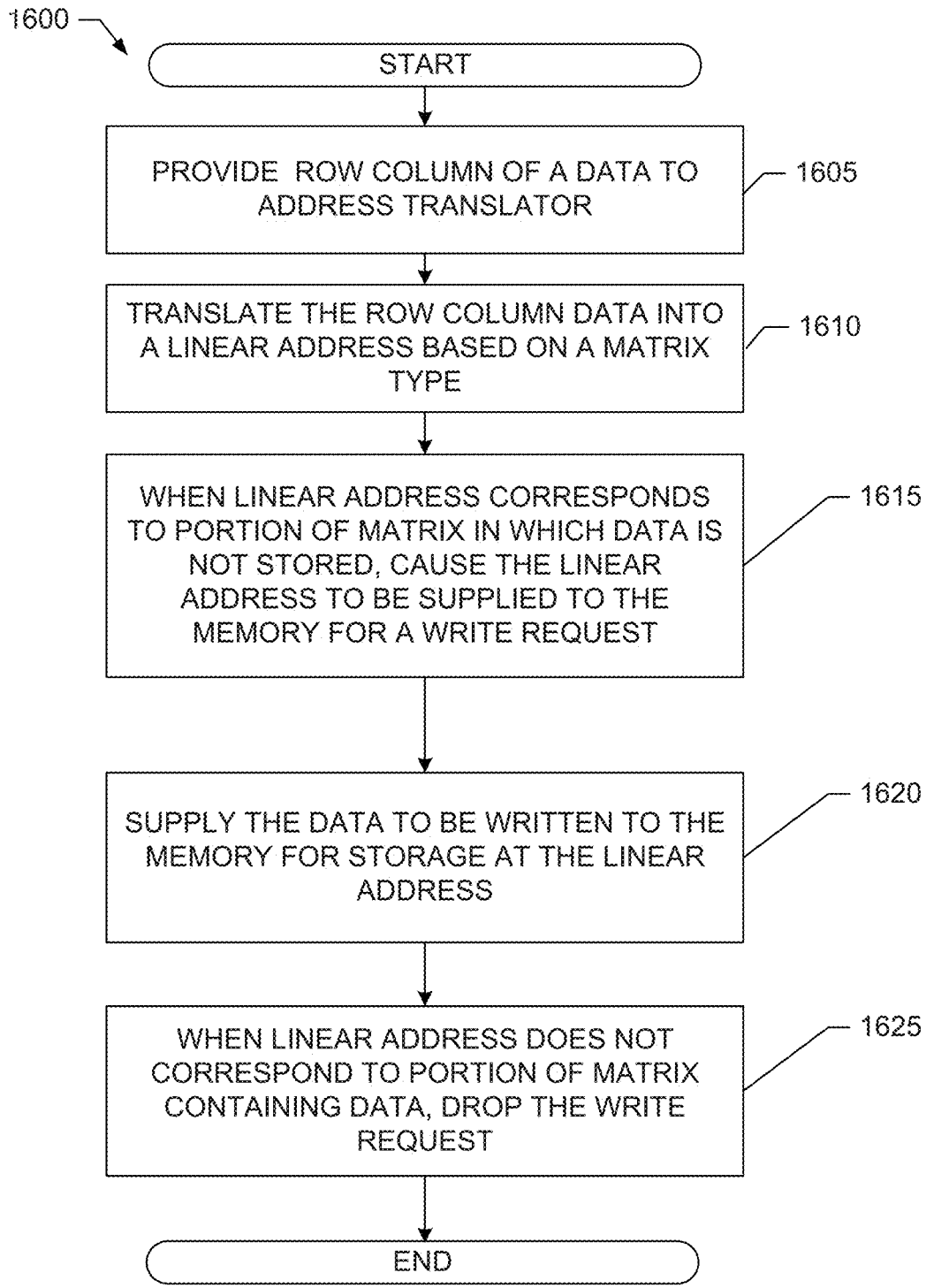
FIG. 16 is a flowchart representative of example computer readable instructions that may be executed to implement the example data path controller of FIG. 1 to perform a write access of memory based on row and column information.

An example program 1600 that may be executed to implement the example address translator 118 of the example data path controller 122 (of FIGS. 1 and 7D) configured to perform a write translation is represented by the flowchart shown in FIG. 16. The example program 1600 may be executed at predetermined intervals, based on an occurrence of a predetermined event, etc., or any combination thereof. With reference to the preceding figures and associated written descriptions, the example program 1600 of FIG. 16 of begins at block 1605. At block 1605, information identifying the location of a data element stored in a matrix is provided in a row number, column number format to the address translator 118. At block 1610, the address translator 118 translates the row, column information into a linear address based on a matrix type (e.g., upper triangular storage or lower triangular storage). If the linear address corresponds to the portion (upper or lower) of the storage 702A in which data is stored, at block 1615, the address translator supplies the linear address to the memory address for executing a write request therein as described in connection with FIG. 7D. At block 1620, the data to be written is supplied to the memory for storage at the linear address as described in connection with FIG. 7D. At block 1625, when the linear address does not correspond to the portion (upper or lower) of the storage 702A in which data is stored, the write request is dropped to prevent the write request from being performed as described in connection with FIG. 7D. After block 1625, the program ends.

Figure 17:
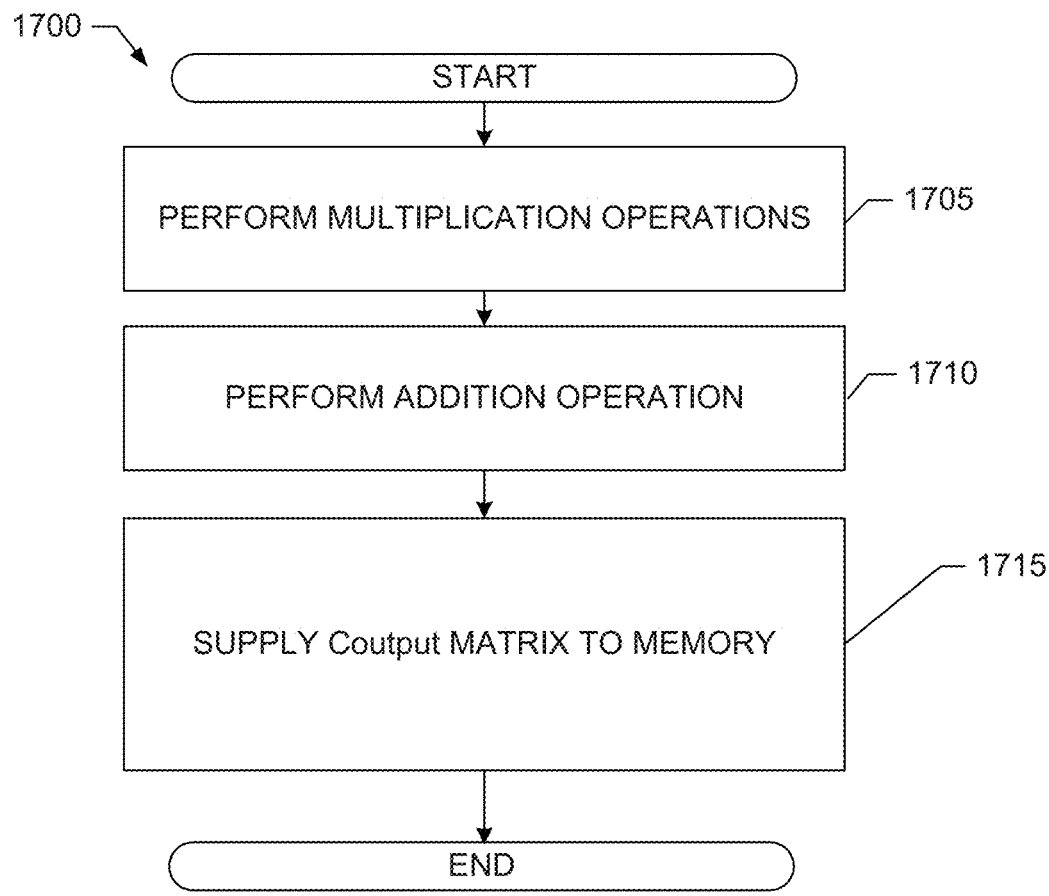
FIG. 17 is a flowchart representative of example computer readable instructions that may be executed to implement the example output logic of FIG. 1 to scale and blend an output matrix of the multi-channel n-stage accumulator.

An example program 1700 that may be executed to implement the example output logic of FIG. 1 is represented by the flowchart shown in FIG. 17. The example program 1700 may be executed at predetermined intervals, based on an occurrence of a predetermined event, etc., or any combination thereof. With reference to the preceding figures and associated written descriptions, the example program 1700 of FIG. 17 begins execution at block 1705 at which the example multiplier 802 performs multiplication operations as described with reference to FIG. 8. At block 1710, the adder 804 performs an addition operation as described with reference to FIG. 8. At block 1715, Coutput is supplied to the memory 106 (see FIG. 1) as described in connection with FIG. 8. After the block 1715, the program ends.

Figure 18:
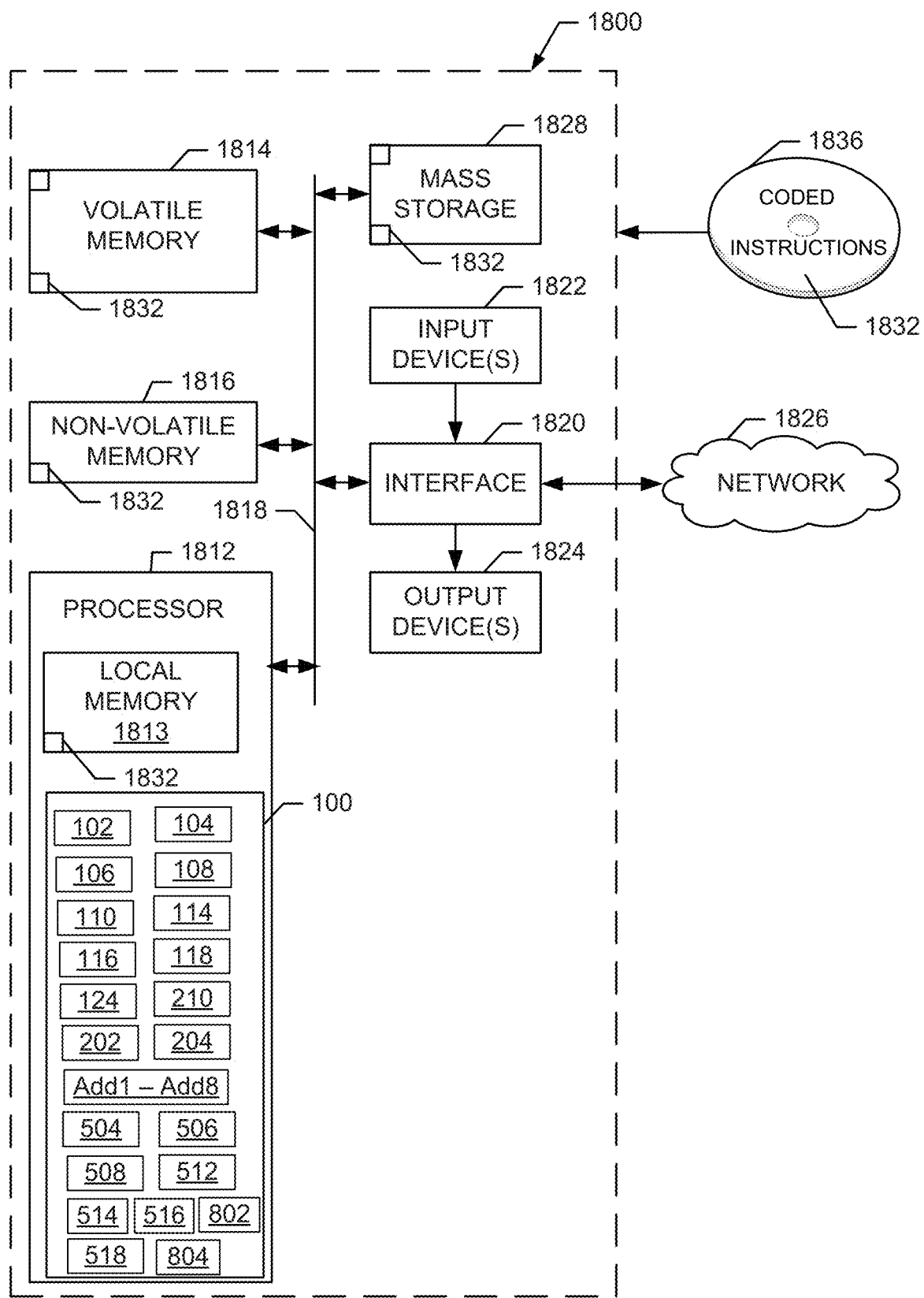
FIG. 18 is a block diagram of an example processor platform structured to execute the example computer readable instructions of FIGS. 9-17 to implement the example matrix multiply system of FIG. 1, FIG. 2, FIG. 3, FIG. 5, FIG. 6A, FIG. 6B FIG. 7A, FIG. 7B, FIG. 7C, FIG. 7D, and/or 8.

FIG. 18 is a block diagram of an example processor platform 1400 structured to execute the instructions of FIGS. 9, 10, 11, 12, 13, 14, 15, and/or 16 to implement the matrix multiply system of FIG. 1, FIG. 2, FIG. 3, FIG. 5, FIG. 6A, FIG. 6B. FIG. 7A, FIG. 7B, FIG. 7C, and/or FIG. 7D. The processor platform 1800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box a digital camera, a headset or other wearable device, or any other type of computing device.

The processor platform 1800 of the illustrated example includes a processor 1812. The processor 1812 of the illustrated example is hardware. For example, the processor 1812 can be implemented by one or more integrated circuits, logic circuits, microprocessors, GPUs, DSPs, or controllers from any desired family or manufacturer. The hardware processor 1812 may be a semiconductor based (e.g., silicon based) device. In this example, the processor 1812 implements the example matrix multiply engine 102, the example host/micro-controller 104, the example memory 106, the example compute engine 108, the example sequencer 110, the example memory requester 120, the example output logic 114, the example configurer 116, the example address generator/translator 118, the example ALU/data buffers 122, the example response handler 124, the example multipliers 202 (m1-m32), the example adders 204A-204H and Add1-Add8, the example multi-channel n-stage accumulator 210, the example input stage 504, the example flush controller 506, the example input selection & sideband control 508, the example N-deep sideband FIFO 514, the example output stage 518, the example N stage adder 512, the example N stage pipe control(ler) 516, the example selectors 510, the example output logic 114, the example multiplier 802, the example adder 804 and/or more generally, the matrix multiply system 100.

The processor 1812 of the illustrated example includes a local memory 1813 (e.g., a cache). The processor 1812 of the illustrated example is in communication with a main memory including a volatile memory 1814 and a non-volatile memory 1816 via a link 1818. The link 1818 may be implemented by a bus, one or more point-to-point connections, etc., or a combination thereof. The volatile memory 1814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1816 may be implemented by flash memory and/or any other desired type of memory device. Access to the main memory 1814, 1816 is controlled by a memory controller.

The processor platform 1800 of the illustrated example also includes an interface circuit 1820. The interface circuit 1820 may be implemented by any type of interface standard, such as an Ethernet interface, a universal serial bus (USB), a Bluetooth® interface, a near field communication (NFC) interface, and/or a PCI express interface.

In the illustrated example, one or more input devices 1822 are connected to the interface circuit 1820. The input device(s) 1822 permit(s) a user to enter data and/or commands into the processor 1812 for use by the example configurer 116. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 1800, can allow the user to control the computer system and provide data to the computer using physical gestures, such as, but not limited to, hand or body movements, facial expressions, and face recognition.

One or more output devices 1824 are also connected to the interface circuit 1820 of the illustrated example. The output devices 1824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speakers(s). The interface circuit 1820 of the illustrated example, thus, typically includes a graphics driver card, a graphics driver chip and/or a graphics driver processor.

The interface circuit 1820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1800 of the illustrated example also includes one or more mass storage devices 1828 for storing software and/or data. Examples of such mass storage devices 1828 include floppy disk drives, hard drive disks, compact disk drives, Blu-ray disk drives, redundant array of independent disks (RAID) systems, and digital versatile disk (DVD) drives. In some examples, the mass storage device 1828 or any of the storage devices disclosed in connection with FIG. 18 may implement any of the memories, cache devices, buffers, registers, etc. of FIGS. 1-8. Additionally, or alternatively, in some examples the volatile memory 1814 may implement any of the memories, cache devices, buffers, registers, etc. of FIGS. 1-8.

The machine executable instructions 1832 corresponding to the instructions of FIGS. 9, 10, 11, 12, 13, 14, 15, and/or 16, may be stored in the mass storage device 1828, in the volatile memory 1814, in the non-volatile memory 1816, in the local memory 1813 and/or on a removable non-transitory computer readable storage medium, such as a CD or DVD 1836.

From the foregoing, it will be appreciated that example methods, apparatus and articles of manufacture have been disclosed that perform accelerated matrix multiplication. The dedicated optimized functionality for performing matrix multiplication disclosed herein provides numerous advances over conventional, existing systems including reductions in power consumption, increases in performance, reductions in the area/footprint, and increased bandwidth across multiple design points. For example an accelerator matrix multiply engine disclosed herein offloads the computation of linear algebra algorithms from a CPU thereby enabling the usage of devices that operate at a high sample rate. Increasing the operating speed of a data processing pipeline by deploying the example accelerator matrix multiply engine disclosed herein further serves to increase the precision and robustness of output data generated by such a data processing pipeline. Further, the deployment of the example accelerator matrix multiply engines disclosed herein aid in reducing any drift that might be introduced by sensors associated with the data processing pipeline.

Also, example compute engines disclosed herein include a broadcast interconnect to provide first operand data to multiplier nodes arranged in a row of the two dimensional array/grid. Using the broadcast interconnect in this manner allows for spatial reuse of the first operand data. Some example compute engines disclosed herein also include a unicast interconnect to provide second operand data to the multiplier nodes. In some examples, the second operand data is replaced with newly-generated second operand data after an example number (e.g., a few) of clock cycles. Providing the second operand data in this manner allows for temporal reuse of the second operand data. Example matrix multiply engines disclosed herein also include a multi-channel N-stage accumulator for partial accumulation of output data with an accumulation circuit capable of performing bubble free accumulation with high-speed, multi-staged floating point adders. Bubble-free accumulation means that the multi-channel n-stage accumulator is capable of processing valid data in every clock cycle (e.g., with zero idle cycles).

Example matrix multiply engines disclosed herein further include an example data path controller having an on-the-fly cache-based computation unit in a response handler. In some examples, the on-the-fly-cache based computation unit can transpose a matrix. The example data path controller, in some examples, further includes a cache for the first operand data to allow temporal reuse of the first operand data and a data buffer to hold the second operand data.

Buffers of the multi-channel n-stage accumulator included in the matrix multiply engines store partial output tiles of data and are located near the compute engine in the microarchitecture. The ability to store partial output tiles of data in the buffers without the need to transfer the partial output tiles to and from a memory, as well as the placement of the buffers near the compute engine both improve the performance of the matrix multiply engine when operating on larger matrices as described further below. In addition, the sequencer, which is integrated in the matrix multiply engine, eliminates the need for CPU intervention which further enhances the performance of the matrix multiply engine. The example matrix multiply engine disclosed herein also performs in-place transpose/computation of the first and second operands and performs blending and scaling operations for single precision general matrix multiplication ("SGEMM"). As a result of using in-place transpose/computation, the matrix multiply engines require less storage because any intermediate results generated during the multiplication operations need not be stored but instead remain in place. Both of these operations reduce the amount of memory required as well as a number of memory accesses performed by the matrix multiply engine and thereby results in further power saving and faster operating speeds.

Additional advantages of the matrix multiply engine disclosed herein are effected through the use of compact storage for special types of matrices. The compact storage results in a smaller memory footprint and decreased power consumption. Example intelligent walking patterns (i.e., half compute, diagonal compute, etc.) performed by the example matrix multiply engine also help to avoid unnecessary compute operations while reducing latency and power consumption. Additionally, the example micro-architecture of the example multi-channel N stage accumulation technique performed by the matrix multiply engine provides design scalability for pushing frequency (e.g., increasing the frequency bandwidth, as needed to perform in a wide range of design configurations and applications). The ability to push the clock frequency is achieved by reducing a delay of a combinatorial path. As the maximum frequency of a combinatorial logical circuit depends on a number of levels of gate logic, to reduce the number of gate logic levels to thereby boost the frequency, additional flop stages (N stages) are inserted in the combinatorial path. While this increases flop stages of the design, it also reduces the level of logic and effectively pushes the frequency to higher limits. Further the multipliers and adders of the compute engine support operation in floating point number format. For the most part, the matrix multiply engine disclosed herein supports integer and other precision number formats as well. The usage the multi-channel n-stage accumulator plays an important role in enabling floating point operation by compensating for latencies of the compute engine.

The following further examples, which include subject matter such as an apparatus to implement a matrix multiply system, a non-transitory computer readable medium including instructions that, when executed, cause at least one processor to implement matrix multiply operations, and a method to implement matrix multiply operations are disclosed herein. The disclosed examples can be implemented individually and/or in one or more combinations.

Example methods, apparatus, articles of manufacture to perform accelerated matrix multiplication are disclosed herein. Further examples and combinations thereof include the following:

Example 1 includes an apparatus to multiply matrices. The apparatus includes a compute engine having a plurality of multipliers arranged in a two dimensional array. The two dimensional array has a plurality of array locations defined by a first plurality of columns and a first plurality of rows. The ones of the plurality of multipliers are located at ones of the plurality of array locations. The compute engine also includes a plurality of adders arranged in a second plurality of columns and each of the second plurality of columns corresponds to one of the first plurality of columns. The compute engine additionally includes a broadcast interconnect between a cache and the plurality of multipliers and the broadcast interconnect broadcasts respective ones of a first set of operand data elements to the plurality of multipliers in respective ones of the rows of the array. The compute engine further includes a unicast interconnect between a data buffer and the multipliers and the unicast interconnect unicasts respective ones of a second set of operand data elements to respective ones of the multipliers. The ones of the multipliers multiply the first and second operands of data elements provided to the ones of the multipliers to generate a plurality of outputs. The adders add at least two of the outputs generated by at least two of the multipliers.

Example 2 includes the apparatus of example 1 wherein the outputs generated by the multipliers in the first plurality of columns are added by the adders in the corresponding ones of the second plurality of columns.

Example 3 includes the apparatus of example 1, wherein ones of the second plurality of columns include levels of adders, a first level of the adders to add the outputs of the multipliers to generate a first level of sums, and a second level of adders to add the first level of sums.

Example 4 includes the apparatus of example 3 wherein a number of the adders included in ones of the second plurality of columns is one less than a number of multipliers included in ones of the first plurality of columns.

Example 5 includes the apparatus of example 1 wherein the multiplying and adding performed by the multipliers and the adders, respectively, are performed in a same clock cycle.

Example 6 includes the apparatus of example 1, wherein, the first set of operands in the cache are processed during a first clock cycle, the broadcast interconnect replaces the first set of operands with a different first set of operands before each subsequent clock cycle until a number of clock cycles have elapsed; and the second set of operands supplied to the buffer remain in the buffer until the number of clock cycles have elapsed.

Example 7 includes the apparatus of example 6, wherein the first set of operands is one of a plurality of first sets of operands and the second set of operands is one of a plurality of second sets of operands, and the plurality of first sets of operands are multiplied with one of the plurality of second operands until a last one of the plurality of first sets of operands has been multiplied with the one of the plurality of second operands.

Example 8 includes the apparatus of example 1 wherein the adders of the second plurality of columns generate output sums during each clock cycle, and the set of output sums represent a partial matrix.

Example 9 includes the apparatus of example 8, wherein the partial matrix includes a single row having a same number of columns as the first plurality of columns.

Example 10 includes the apparatus of example 8, wherein the partial matrix is supplied to a multi-channel n-stage accumulator.

Example 11 includes the apparatus of example 10, wherein the multi-channel n-stage accumulator generates a full output matrix based on a plurality of partial matrices.

Example 12 includes the apparatus of example 11, wherein the multi-channel n-stage accumulator generates the full output matrix based on the plurality of partial matrices without storing the plurality of partial matrices.

Example 13 includes a hardware logic having a means to multiply a first set of operands with a second set of operands. The means to multiply include a plurality of multipliers arranged in a two dimensional array having a plurality of array locations defined by a first plurality of columns and a plurality of rows. The ones of the plurality of multipliers located at ones of the plurality of array locations. The hardware logic also includes a plurality of means to add and the means to add are arranged in a second plurality of columns. Each of the second plurality of columns corresponds to one of the first plurality of columns. Further, the hardware logic includes a means to broadcast data between a cache and the means to multiply, the means to broadcast broadcast respective ones of a first set of operand data elements to the multipliers in respective ones of the rows of the array. Additionally, the hardware logic includes and a means to unicast data between a data buffer and the means to multiply, the means to unicast is to unicast respective ones of a second set of operand data elements to respective ones of the multipliers. Further, the multipliers multiply the first and second operands of data elements to generate a plurality of outputs, and the means to add add at least two of the outputs generated by at least two of the multipliers.

Example 14 includes the hardware logic of example 13, wherein ones of the second plurality of columns include a first level of the means to add to add the outputs of the multipliers to generate a first level of sums, and a second level of the means to add to add the first level of sums.

Example 15 includes the hardware logic of example 14, wherein a number of the plurality of means to add included in ones of the second plurality of columns is one less than the multipliers in the corresponding ones of the first plurality of columns.

Example 16 includes the hardware logic of example 13, wherein the multiplying and adding performed by the multipliers and the means to add, respectively, are performed in a same clock cycle.

Example 17 includes the hardware logic of example 13, wherein the first set of operands supplied to the cache are processed during a first clock cycle, the first set of operands are replaced with a different first set of operands before each subsequent clock cycle until a number of clock cycles have elapsed, and the second set of operands supplied to the buffer remain in the buffer until the number of clock cycles have elapsed.

Example 18 includes the hardware logic of example 17, wherein the first set of operands is one of a plurality of first sets of operands and the second set of operands is one of a plurality of second sets of operands, and the plurality of first sets of operands are multiplied with one of the plurality of second operands.

Example 19 includes the hardware logic of example 13, wherein the means to add disposed in respective ones of the second plurality of columns generate respective output sums during each clock cycle, and the output sums represent a partial matrix.

Example 20 includes the hardware logic of example 19, wherein the partial matrix includes a single row having a same number of columns as the number of columns included in the first plurality of columns.

Example 21 includes the hardware logic of example 19, wherein the partial matrix is supplied to a means to accumulate.

Example 22 includes a method to multiply matrices. The method is performed by a hardware logic and includes broadcasting from a cache to a plurality of multipliers, respective ones of a first set of operand data elements to ones of the plurality of multipliers in respective ones of the rows of the array. The plurality of multipliers are arranged in a two dimensional array having a plurality of array locations defined by a first plurality of columns and a plurality of rows. The ones of the plurality of multipliers are located at the ones of the plurality of array locations. The method also includes unicasting from a data buffer to the plurality of multipliers, respective ones of a second set of operand data elements to respective ones of the plurality of multipliers, and further includes multiplying, with the plurality of multipliers, the first and second operands of data elements to generate a plurality of outputs. The method additionally includes adding with a plurality of adders at least two of the outputs generated by at least two of the multipliers, where the plurality of adders are arranged in a second plurality of columns, and each of the second plurality of columns corresponds to one of the first plurality of columns.

Example 23 includes the method of example 22, wherein the outputs generated by the multipliers in the first plurality of columns are added by adders in the corresponding ones of the second plurality of columns.

Example 24 includes the method of example 22, wherein ones of the second plurality of columns include levels of adders and the method further includes causing a first level of the adders to add the outputs of the multipliers to generate a first level of sums, and includes causing a second level of the adders to add the first level of sums.

What is claimed is:

1. An apparatus to multiply matrices, the apparatus comprising:
    a compute engine including:
    a plurality of multipliers arranged in a two dimensional array having a plurality of array locations defined by a first plurality of columns and a first plurality of rows, ones of the plurality of multipliers located at ones of the plurality of array locations;
    a plurality of adders arranged in a second plurality of columns, each of the second plurality of columns corresponding to one of the first plurality of columns;
    a broadcast interconnect between a cache and the plurality of multipliers, the broadcast interconnect to broadcast a first one of a first set of operand data elements in the cache to multiple ones of the multipliers included in a first one of the rows of the array;
    a unicast interconnect between a data buffer and the multipliers, the unicast interconnect to unicast respective ones of a second set of operand data elements in the buffer to respective ones of the multipliers in the array;
    the ones of the multipliers in the array to multiply the first and second operands of data elements provided to the ones of the multipliers to generate a plurality of outputs; and
    the adders to add at least two of the outputs generated by at least two of the multipliers.

2. The apparatus of claim 1, wherein outputs generated by the multipliers in the first plurality of columns are added by adders in the corresponding ones of the second plurality of columns.

3. The apparatus of claim 2, wherein ones of the second plurality of columns include levels of adders, a first level of the adders to add the outputs of the multipliers to generate a first level of sums, and a second level of adders to add the first level of sums.

4. The apparatus of claim 3, wherein a number of the adders included in ones of the second plurality of columns is one less than a number of multipliers included in ones of the first plurality of columns.

5. The apparatus of claim 1, wherein the multiplying and adding performed by the multipliers and the adders, respectively, are performed in a same clock cycle.

6. The apparatus of claim 1, wherein, the first set of operands in the cache are processed during a first clock cycle, the broadcast interconnect replaces the first set of operands with a different first set of operands before each subsequent clock cycle until a number of clock cycles have elapsed; and the second set of operands supplied to the buffer remain in the buffer until the number of clock cycles have elapsed.

7. The apparatus of claim 6, wherein the first set of operands is one of a plurality of first sets of operands and the second set of operands is one of a plurality of second sets of operands, and the plurality of first sets of operands are multiplied with one of the plurality of second operands until a last one of the plurality of first sets of operands has been multiplied with the one of the plurality of second operands.

8. The apparatus of claim 1, wherein the adders of the second plurality of columns generate a set of output sums during each clock cycle, and the set of output sums represent a partial matrix.

9. The apparatus of claim 8, wherein the partial matrix includes a single row having a same number of columns as the first plurality of columns.

10. The apparatus of claim 8, wherein the partial matrix is supplied to a multi-channel n-stage accumulator.

11. The apparatus of claim 10, wherein the multi-channel n-stage accumulator generates a full output matrix based on a plurality of partial matrices.

12. The apparatus of claim 11, wherein the multi-channel n-stage accumulator generates the full output matrix based on the plurality of partial matrices without storing the plurality of partial matrices.

13. A hardware logic comprising:
    means to multiply a first set of operands with a second set of operands, the means to multiply including:
    a plurality of multipliers, the multipliers arranged in a two dimensional array having a plurality of array locations defined by a first plurality of columns and a plurality of rows, ones of the plurality of multipliers located at ones of the plurality of array locations;
    a plurality of means to add, the means to add arranged in a second plurality of columns, each of the second plurality of columns corresponding to one of the first plurality of columns;
    means to broadcast data between a cache and the multipliers, the means to broadcast to broadcast a first one of a first set of operand data elements in the cache to multiple ones of the multipliers in included in a first one of the rows of the array; and
    means to unicast data between a data buffer and the means to multiply, the means to unicast to unicast respective ones of a second set of operand data elements in the buffer to respective ones of the multipliers in the array;
    the multipliers to multiply the first and second operands of data elements to generate a plurality of outputs; and
    the means to add to add at least two of the outputs generated by at least two of the multipliers.

14. The hardware logic of claim 13, wherein ones of the second plurality of columns include a first level of the means to add to add the outputs of the multipliers to generate a first level of sums, and a second level of the means to add to add the first level of sums.

15. The hardware logic of claim 14, wherein a number of the plurality of means to add included in ones of the second plurality of columns is one less than the multipliers in the corresponding ones of the first plurality of columns.

16. The hardware logic of claim 13, wherein the multiplying and adding performed by the multipliers and the means to add, respectively, are performed in a same clock cycle.

17. The hardware logic of claim 13, wherein the first set of operands supplied to the cache are processed during a first clock cycle, the first set of operands are replaced with a different first set of operands before each subsequent clock cycle until a number of clock cycles have elapsed, and the second set of operands supplied to the buffer remain in the buffer until the number of clock cycles have elapsed.

18. The hardware logic of claim 17, wherein the first set of operands is one of a plurality of first sets of operands and the second set of operands is one of a plurality of second sets of operands, and the plurality of first sets of operands are multiplied with one of the plurality of second operands.

19. The hardware logic of claim 13, wherein the means to add disposed in respective ones of the second plurality of columns generate respective output sums during each clock cycle, and the output sums represent a partial matrix.

20. The hardware logic of claim 19, wherein the partial matrix includes a single row having a same number of columns as the number of columns included in the first plurality of columns.

21. The hardware logic of claim 19, wherein the partial matrix is supplied to a means to accumulate.

22. A method to multiply matrices, the method performed by a hardware logic, the method comprising:
broadcasting, from a cache to a plurality of multipliers, respective ones of a first set of operand data elements to ones of the plurality of multipliers in respective ones of a plurality of rows of an array, the plurality of multipliers arranged in a two dimensional array having a plurality of array locations defined by a first plurality of columns and the plurality of rows, ones of the plurality of multipliers located at ones of the plurality of array locations, the broadcasting including broadcasting a first one of a first set of operand data elements in the cache to multiple ones of the multipliers included in a first one of the rows of the array;
unicasting, from a data buffer to the plurality of multipliers, respective ones of a second set of operand data elements to respective ones of the plurality of multipliers;
multiplying, with the plurality of multipliers, the first and second operands of data elements to generate a plurality of outputs; and
adding with a plurality of adders at least two of the outputs generated by at least two of the multipliers, the plurality of adders arranged in a second plurality of columns, and each of the second plurality of columns corresponding to one of the first plurality of columns.

23. The method of claim 22, wherein the outputs generated by the multipliers in the first plurality of columns are added by adders in the corresponding ones of the second plurality of columns.

24. The method of claim 22, wherein ones of the second plurality of columns include levels of adders, the method further including:
causing a first level of the adders to add the outputs of the multipliers to generate a first level of sums; and
causing a second level of the adders to add the first level of sums.

* * * * *

UNITED STATES PATENT AND TRADEMARK OFFICE
CERTIFICATE OF CORRECTION

PATENT NO. : 11,347,828 B2
APPLICATION NO. : 16/833210
DATED : May 31, 2022
INVENTOR(S) : Biji George et al.

Page 1 of 1

It is certified that error appears in the above-identified patent and that said Letters Patent is hereby corrected as shown below:

In the Claims

Claim 13, Line 40, delete "multipliers in included" and insert -- multipliers included --.

Signed and Sealed this
Eighth Day of November, 2022

Katherine Kelly Vidal
*Director of the United States Patent and Trademark Office*